(12) United States Patent
Koch et al.

(10) Patent No.: US 12,282,190 B2
(45) Date of Patent: Apr. 22, 2025

(54) CHIP-TO-CHIP OPTICAL INTERCONNECTION USING HIGH REFRACTIVE INDEX COUPLERS

(71) Applicant: Arizona Board of Regents on Behalf of the University of Arizona, Tucson, AZ (US)

(72) Inventors: Thomas L. Koch, Tucson, AZ (US); Erfan M. Fard, Tucson, AZ (US); Roland Himmelhuber, Tucson, AZ (US); Linan Jiang, Tucson, AZ (US); Stanley K. H. Pau, Tucson, AZ (US); Robert A. Norwood, Tucson, AZ (US); Kyungjo Kim, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 325 days.

(21) Appl. No.: 17/615,136

(22) PCT Filed: Jun. 1, 2020

(86) PCT No.: PCT/US2020/035512
§ 371 (c)(1),
(2) Date: Nov. 30, 2021

(87) PCT Pub. No.: WO2020/243692
PCT Pub. Date: Dec. 3, 2020

(65) Prior Publication Data
US 2022/0244458 A1    Aug. 4, 2022

Related U.S. Application Data

(60) Provisional application No. 62/855,341, filed on May 31, 2019.

(51) Int. Cl.
G02B 6/122    (2006.01)
G02B 6/12     (2006.01)
G02B 6/30     (2006.01)

(52) U.S. Cl.
CPC ......... G02B 6/1228 (2013.01); G02B 6/1221 (2013.01); G02B 6/1223 (2013.01);
(Continued)

(58) Field of Classification Search
CPC ........ G02B 6/1228; G02B 6/305; G02B 6/14; G02B 6/1223; G02B 2006/12147;
(Continued)

(56) References Cited

U.S. PATENT DOCUMENTS 4,679,894 A * 7/1987 Pavlath .................. G02B 6/283
385/41
6,631,225 B2 10/2003 Lee
(Continued)

FOREIGN PATENT DOCUMENTS

EP         3153899 A1 *  4/2017 ......... G02B 6/12002
WO   WO-2015147966 A2 * 10/2015 ......... G02B 6/12007
(Continued)

OTHER PUBLICATIONS

Sung H. Cho, Jung Min Kim, Jae G. Kim, Won S. Chang, Eung S. Lee, "Fabrication of optical waveguides using laser direct writing method," Proc. SPIE 5448, High-Power Laser Ablation V, Sep. 20, 2004, doi: 10.1117/12.546816 (Year: 2004).*
(Continued)

*Primary Examiner* — Daniel Petkovsek
*Assistant Examiner* — Emma R. Oxford
(74) *Attorney, Agent, or Firm* — Kaplan Breyer Schwarz LLP

(57) ABSTRACT

A method for establishing optical coupling between spatially separated first and second planar waveguides includes
(Continued)

arranging an optical interconnect on the first planar waveguide. The optical interconnect has first and second end portions and an intermediate portion. Each of the end portions has an inverse taper. The second planar waveguide is arranged on the optical interconnect so that the second planar waveguide overlaps with one of the inverse tapered end portions but not the other inverse tapered end portion to thereby enable an adiabatic transition of an optical signal from the first planar waveguide to the second planar waveguide via the optical interconnect. The first and second planar waveguides have different refractive indices at an operating wavelength and the optical interconnect have a higher refractive index at the operating wavelength than the refractive indices of a core of the first planar waveguide and a core of the second planar waveguide.

31 Claims, 24 Drawing Sheets

(52) U.S. Cl.
CPC .... *G02B 6/305* (2013.01); *G02B 2006/12147* (2013.01); *G02B 2006/12173* (2013.01); *G02B 2006/12176* (2013.01); *G02B 2006/1219* (2013.01)

(58) Field of Classification Search
CPC ....... G02B 6/00–567; G02B 2006/0098–4297; G02B 6/12–126; G02B 2006/12035–12197
See application file for complete search history.

(56) References Cited

U.S. PATENT DOCUMENTS

| | | | | |
|---|---|---|---|---|
| 7,369,727 | B2 * | 5/2008 | Shih | G02B 6/12004 385/28 |
| 2006/0039647 | A1 * | 2/2006 | Ling | G02B 6/12007 385/24 |
| 2012/0195332 | A1 * | 8/2012 | Yoffe | H01S 5/1032 372/98 |
| 2012/0224813 | A1 | 9/2012 | Chen | |
| 2013/0315536 | A1 * | 11/2013 | Huang | G02B 6/26 385/43 |
| 2013/0322813 | A1 | 12/2013 | Grondin | |
| 2013/0343695 | A1 | 12/2013 | Ben Bakir | |
| 2016/0131842 | A1 | 5/2016 | Mahgerefteh | |
| 2016/0139334 | A1 * | 5/2016 | Sakakibara | G02B 6/1228 385/43 |
| 2016/0327742 | A1 * | 11/2016 | Collins | G02B 6/1228 |
| 2017/0097467 | A1 * | 4/2017 | Gates | H01L 25/167 |
| 2017/0199328 | A1 | 7/2017 | Shubin | |
| 2018/0100970 | A1 * | 4/2018 | Park | G02B 6/1228 |
| 2018/0156992 | A1 * | 6/2018 | Mahgerefteh | G02B 6/12002 |
| 2018/0246286 | A1 * | 8/2018 | Lohse | G02B 6/305 |
| 2018/0275342 | A1 * | 9/2018 | Shaw | G02B 6/2821 |
| 2018/0314151 | A1 | 11/2018 | Koch | |
| 2019/0098751 | A1 | 3/2019 | Koch | |
| 2019/0146153 | A1 * | 5/2019 | Park | G02B 6/1228 385/43 |
| 2019/0250335 | A1 * | 8/2019 | Kulick | G02B 6/43 |
| 2019/0265415 | A1 * | 8/2019 | Psaila | G02B 6/29331 |
| 2022/0105695 | A1 * | 4/2022 | Jiang | B29D 11/0075 |
| 2024/0166910 | A1 * | 5/2024 | Norwood | G02B 6/305 |
| 2024/0393532 | A1 * | 11/2024 | Fard | G02B 6/14 |

FOREIGN PATENT DOCUMENTS

| | | | | |
|---|---|---|---|---|
| WO | WO-2017059445 A1 * | 4/2017 | ............. | B29D 11/00 |
| WO | WO-2017189955 A1 * | 11/2017 | ............... | G02B 6/12 |

OTHER PUBLICATIONS

M. Dubov, S. R. Natarajan, J. A. R. Williams, and I. Bennion "Mask-less lithography for fabrication of optical waveguides", Proc. SPIE 6881, Commercial and Biomedical Applications of Ultrafast Lasers VIII, 688110, Feb. 15, 2008, doi: 10.1117/12.762594 ( Year: 2008).*
R. Dangel et al., "Polymer Waveguides Enabling Scalable Low-Loss Adiabatic Optical Coupling for Silicon Photonics," in IEEE Journal of Selected Topics in Quantum Electronics, vol. 24, No. 4, pp. 1-11, Jul.-Aug. 2018, Art No. 8200211, doi: 10.1109/JSTQE.2018.2812603. (Year: 2018).*
E. M. Fard, S. Namnabat, S. Arouh, R. A. Norwood, S. Pau and N. Peyghambarian, "Relaxed Tolerance Low-Loss Adiabatic Si3N4 to Polymer Waveguide Coupler for Dense Interconnects," in IEEE Photonics Technology Letters, vol. 33, No. 22, pp. 1227-1230, Nov. 15, 2021, doi: 10.1109/LPT.2021.3112971. (Year: 2021).*
L. Jiang et al., "SmartPrint Single-Mode Flexible Polymer Optical Interconnect for High Density Integrated Photonics," in Journal of Lightwave Technology, vol. 40, No. 12, pp. 3839-3844, Jun. 15, 2022, doi: 10.1109/JLT.2022.3149872. (Year: 2022).*

* cited by examiner

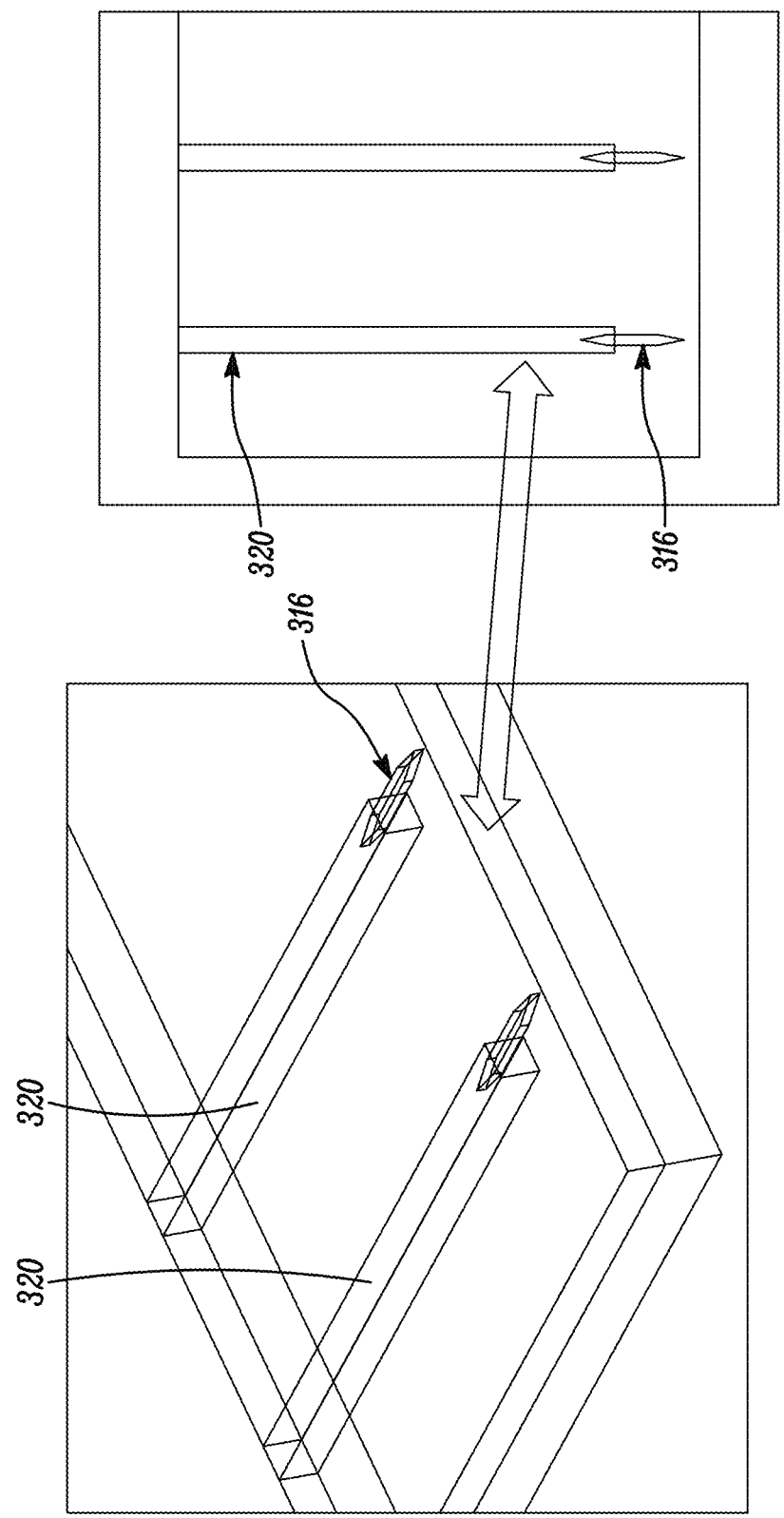

CHIP-TO-CHIP OPTICAL INTERCONNECTION USING HIGH REFRACTIVE INDEX COUPLERS

GOVERNMENT FUNDING

This invention was made with government support under Grant No. FA8650-15-2-5220, awarded by Air Force Material Command. The government has certain rights in the invention.

BACKGROUND

Polymer waveguides (polymer WGs) are promising for photonics interconnects, particularly, for chip-to-chip interconnection. Polymer WGs can be pre-fabricated on various types of substrate including flexible films and assembled on photonic chips with precision alignments to optically couple with waveguides on photonic chips. They can also be made in situ utilizing photosensitive polymer dry films. In the latter case, an unpatterned dry film is laminated on both chips to be interconnected, and waveguides are patterned using a maskless laser direct writing technique implementing alignments with waveguides on both chips. Fabrication of such polymer waveguides is discussed in the following copending patent applications: International Application No. PCT/US18/47455 (Our Ref.: UA18-007), International Application No. PCT/US19/19539 (Our Ref.: UA18-107), and U.S. Provisional Application No. 62/793,964 (Our Ref.: UA19-092).

Most of the waveguides on photonic chips are fabricated using silicon-based CMOS technology. For efficient optical coupling with interconnect polymer WGs, tapers can be incorporated at the end of the photonic WGs and fabricated in the same process of obtaining the waveguides. For example, single mode Si and $Si_3N_4$ waveguides can be realized on chips with a height of 200 nm and a width of 1 μm, which taper down to 100 nm within 0.5 mm-2 mm length. Such tapered waveguides are discussed in International Application No. PCT/US18/15965 (Our Ref.: UA17-132).

Ion-exchanged glass waveguides (IOX WGs), on the other hand, are made in glass substrates utilizing thermal diffusion of ions into the glass. The IOX WGs, in general, are uniform in width without tapers because the thermal diffusion process in fabricating the IOX waveguides makes it difficult to precisely realize tapers with designed dimensions. Since the IOX WGs have lower indices than those of the interconnect polymer waveguides, a tapered waveguide structure can be utilized to couple light between polymer WGs and IOX WGs. One method is to form tapers with 100 nm tip-width directly at the end of the polymer WGs. To fabricate single mode polymer WGs with low loss at 1550 nm, the dimensions of the polymer WGs are about 2 μm in thickness and 2 μm in width. Conventional optical lithography, either using a chrome mask or maskless laser writing, is generally used to define features larger than 500 nm. Electron-beam lithography (EBL) can realize features of 100 nm in designated thin resist films, but it is not optimal for directly patterning fine features in 2 μm-thick polymer films. Alternately, one can pattern a thin photoresist coated on a layer of cured polymer using EBL, and subsequently, try to realize the taper polymer WGs utilizing dry etch of the 2 μm-thick polymer film over an etch mask. However, challenges are present in this process; examples of these challenges include etch-mask pattern formation, etching selectivity between the polymer, the etch mask and glass substrate, and etch mask removal in a solvent at the end of the etching process. The fabrication process can be very complex and has a low yield. In short, fabrication of a high-aspect-ratio taper structure with a 100 nm-wide tip in a 2 μm-thick polymer waveguide is very challenging.

SUMMARY

In accordance with one aspect of the subject matter described herein, a method is presented for establishing optical coupling between spatially separated first and second planar waveguides. In accordance with the method, an optical interconnect is arranged on the first planar waveguide. The optical interconnect has first and second end portions and an intermediate portion. Each of the end portions has an inverse taper. The second planar waveguide is arranged on the optical interconnect so that the second planar waveguide overlaps with one of the inverse tapered end portions but not the other inverse tapered end portion to thereby enable an adiabatic transition of an optical signal from the first planar waveguide to the second planar waveguide via the optical interconnect. The first and second planar waveguides have different refractive indices at an operating wavelength and the optical interconnect have a higher refractive index at the operating wavelength than the refractive indices of a core of the first planar waveguide and a core of the second planar waveguide.

In one particular implementation, the first waveguide is an ion-exchanged glass waveguide and the second waveguide is a polymer waveguide.

In another implementation, at least one of the first and second inverse tapers is an in-plane taper.

In yet another implementation, at least one of the first and second inverse tapers is a vertical taper.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 5(b) shows a more detailed view of the tapered couplers and the polymer WGs shown in FIG. 5(a); and FIG. 5(c) shows a top view of the tapered couplers and the polymer WGs shown in FIGS. 5(a) in 5(b).

FIGS. 7(d)-7(f) show additional views of the polymer WG and the tapered coupler illustrating the different planes they are located on.

DETAILED DESCRIPTION

Figure 1A:
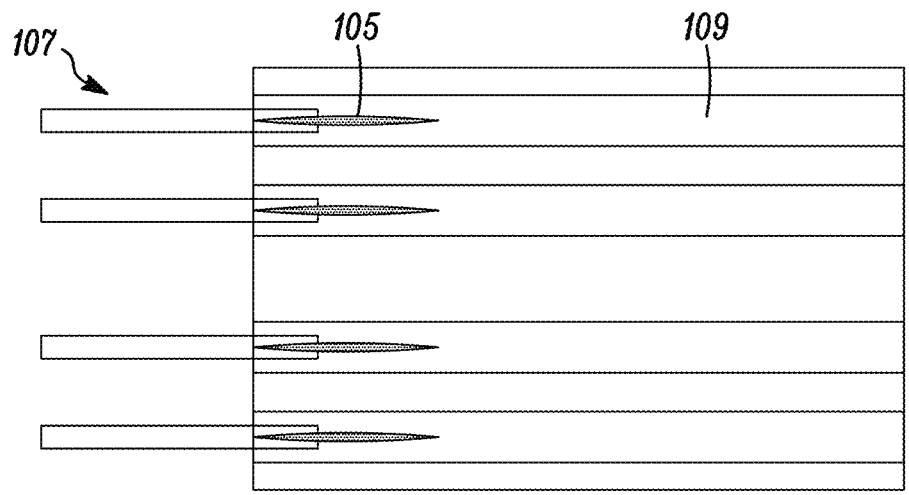
FIGS. 1(a) and 1(b) show top views of straight and S-shaped tapered couplers, respectively, which each couples a polymer waveguide (WG) to an ion-exchanged glass (IOX) WG.
Figure 1B:
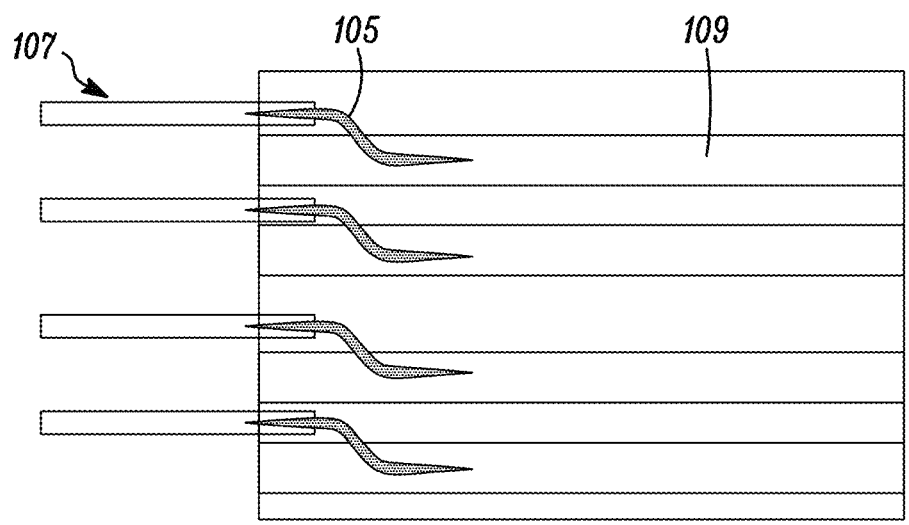

As explained below, new approaches are presented to implement interconnects of polymer WGs with IOX WGs which utilize high refractive index couplers. As shown in FIG. 1(a), high index tapered couplers 105 each comprise an inverse taper (generally referred to simply as a "taper" hereinafter) at each end of a uniform-width central waveguide segment. The high index tapered couplers 105 in this example couple polymer WGs 107 to IOX WGs 109. In one embodiment, the uniform-width central waveguide segment between the tapers is about 1 μm in width and 2 mm-4 mm in length. The width at each end of the tapered coupler 105 tapers down from 1 μm to about 100 nm within a length of 2 mm. The tapered couplers 105, made of a high refractive index material, can be designed in various configurations, and typically have a thickness about 200 nm. FIG. 1(b) shows S-bend high index tapered couplers 105, where the central waveguide segment has a S-bend configuration with a uniform width of e.g., 1 μm, with an inverse taper at each end. The configurations of the high index tapered couplers shown in FIGS. 1(a) and 1(b) are in-plane tapered couplers with uniform thickness in the vertical direction.

Figure 1C:
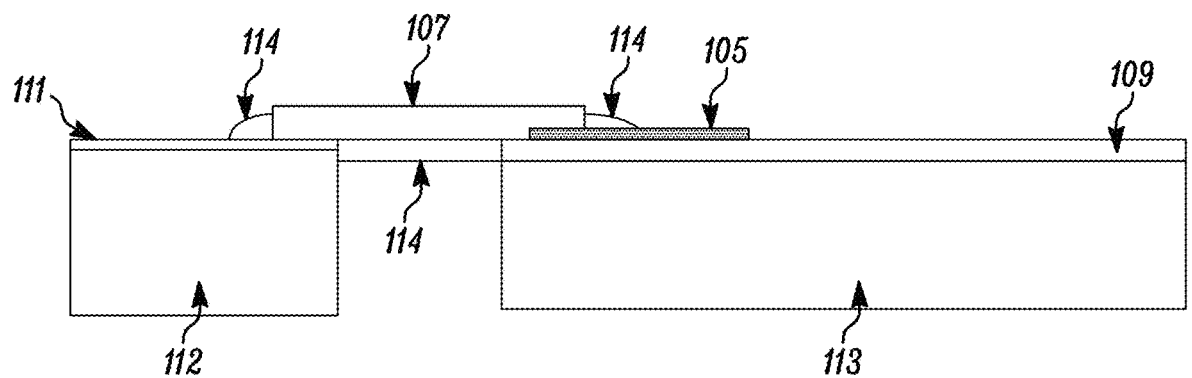
FIGS. 1(c) and 1(d) show side views of an in-plane tapered coupler and a vertically tapered coupler, respectively, which couple a polymer WG to an IOX WG.

FIG. 1(c) illustrates the coupling between the polymer WGs 107 and the IOX WGs 109 using the tapered coupler 105. As shown, the end of the polymer WGs 107 remote from the tapered coupler 105 is coupled with Si WGs 111 on a separate Si chip 112 to realize an interconnection between Si chip 112 and the IOX glass substrate 113.

Figure 1D:
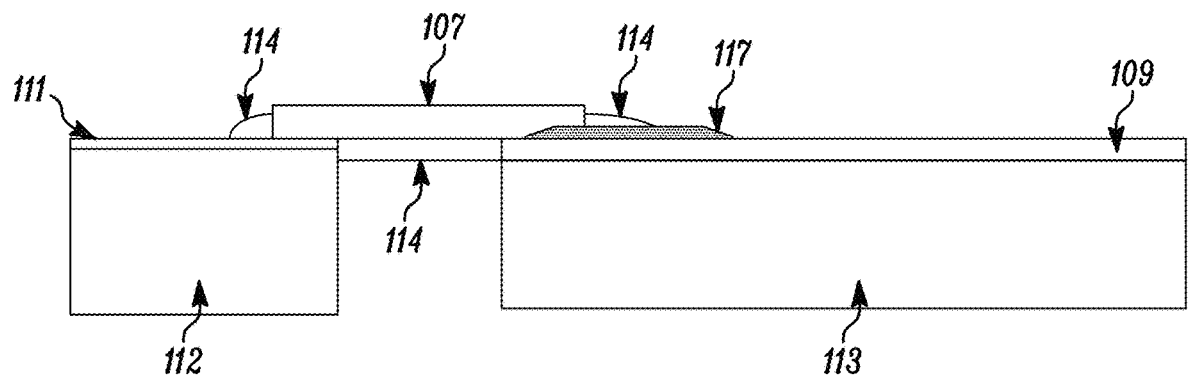

In another embodiment, the tapered couplers taper in the vertical direction, i.e. vary in thickness, instead of tapering in the lateral direction. FIG. 1(d) shows an arrangement similar to that shown in FIG. 1(c) except that the tapered coupler 117 is vertically tapered. The vertically tapered coupler 117 comprises a central waveguide with uniform width and thickness, and two vertical tapers at the ends of the central waveguide. A vertical taper, which changes in the vertical dimension instead of in the lateral dimension, is constructed by tapering down vertically from the maximum waveguide thickness to zero within a given length while maintaining a constant width of the waveguide.

Figure 1E:
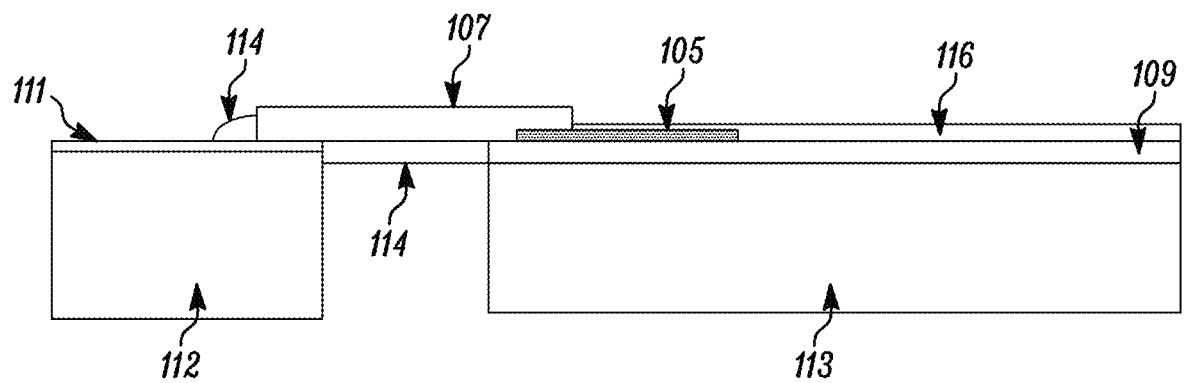
FIGS. 1(e) and 1(f) show side views of an in-plane tapered coupler and a vertically tapered coupler, respectively, which employ an upper cladding layer and which couple a polymer WG to an IOX WG.
Figure 1F:
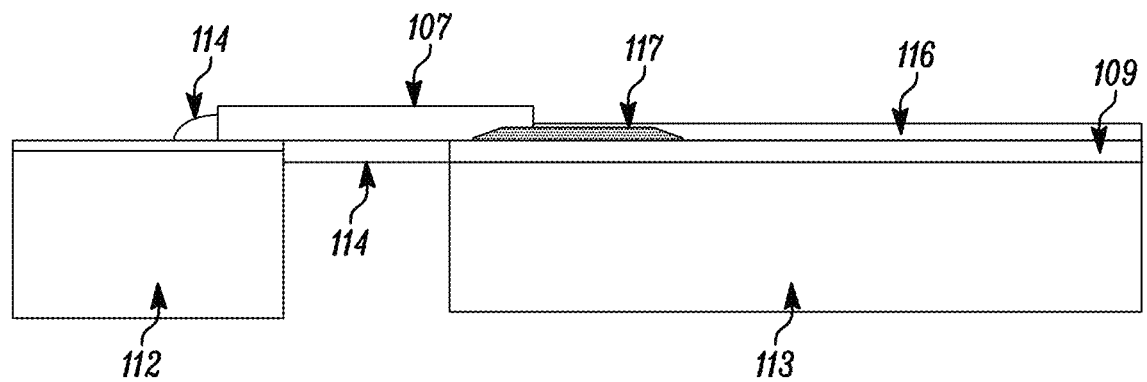

As further illustrated in FIGS. 1(c) and (d), a potting material 114 with an appropriate refractive index is applied on top of the polymer WGs 107 and serves as a top-cladding layer. The potting material 114 also may be applied at locations where the interconnections are formed to minimize transition losses. In addition, a top-cladding layer with a suitable index can be applied on top of the IOX WGs 109. FIGS. 1(e) and (f), which are similar to FIGS. 1(c) and 1(d), respectively, show the use of top-cladding layer 116 to minimize the losses while providing physical protection of the IOX WGs 109.

Materials that are suitable for fabrication of the tapered couplers described herein generally should have low optical loss and high refractive index at the operating wavelength. In some embodiments it is also desirable that the material can be deposited as a thin film with a thickness of about 200 nm at a low temperature less than e.g., 50° C. to 200° C., such that the index profile of the IOX WGs 109 is not altered considerably by thermal diffusion during the deposition process. In addition, the coupler material generally should be compatible with the CMOS fabrication process. Examples of the potential materials for making couplers operating at a wavelength of 1550 nm include, without limitation, $Si_3N_4$ (refractive index 1.9963), $TiO_2$ (refractive index 2.23), GeO (refractive index 1.5871), $Al_2O_3$ (refractive index 1.7462), tantalum pentoxide (refractive index 4.78) and high index polymer (refractive index 1.6-1.8).

Figure 2A:
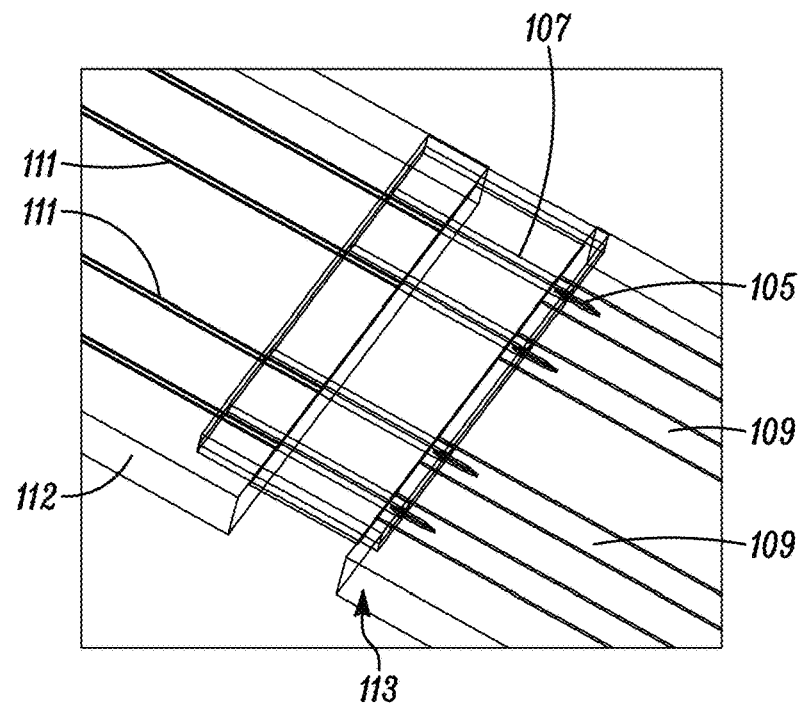
FIG. 2(a) shows a perspective view of tapered couplers that each couple one end of a polymer WG to an IOX WG, with the other end of each polymer WG being coupled to a Si WG.
Figure 2B:
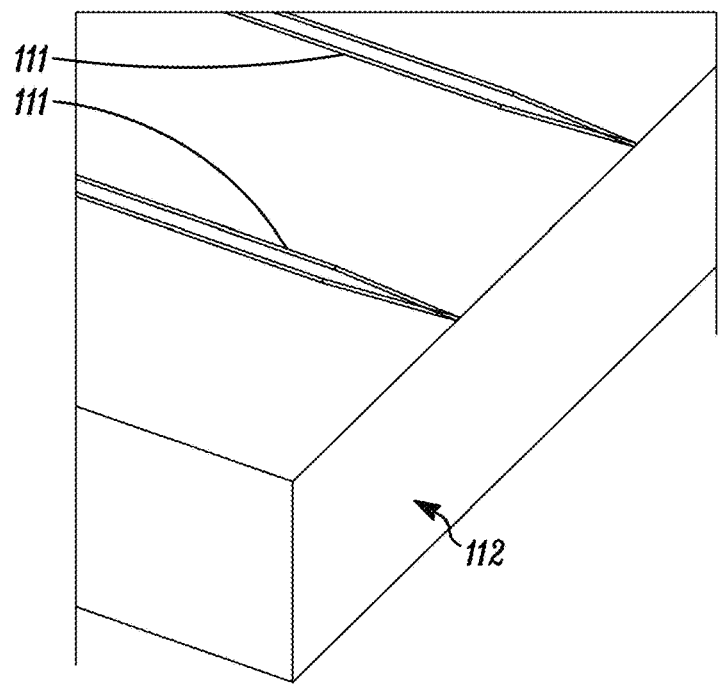
FIG. 2(b) shows a more detailed view of the Si WGs in FIG. 2(a) illustrating their tapered ends.
Figure 2C:
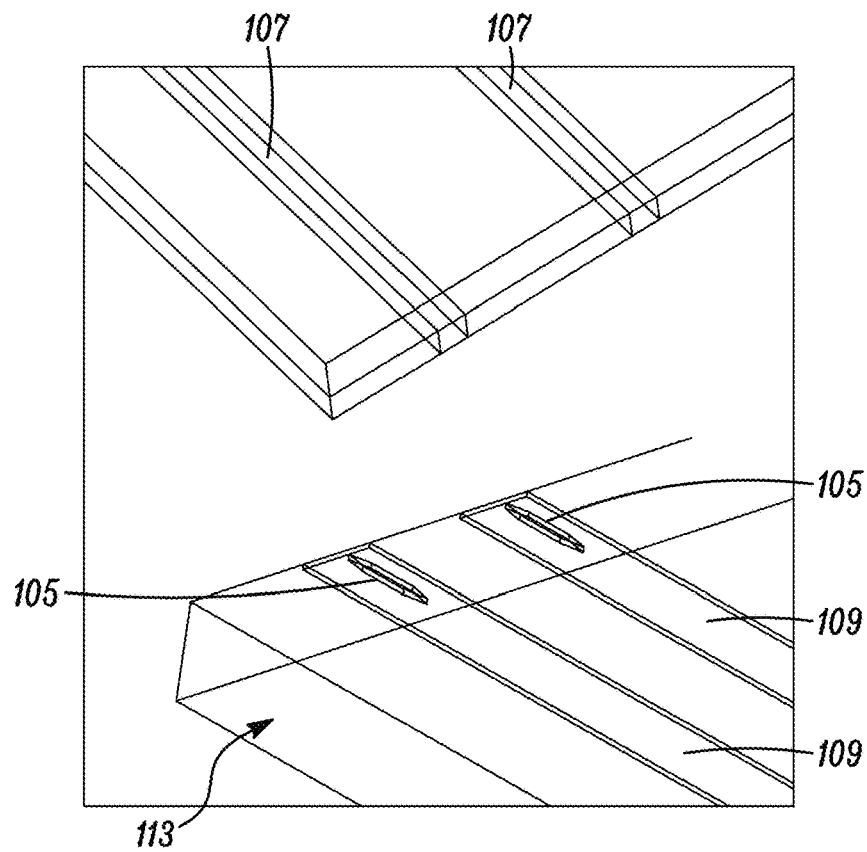
FIG. 2(c) shows the tapered couplers and polymer WGs of FIG. 2(a) prior to attachment.

A typical assembly of the interconnection between two photonic chips is shown in FIGS. 2(a)-2(c). As shown, the uniform-cross-section polymer WGs 107 connect tapered Si/SiN WGs 111 on the Si chip 112 with tapered couplers 105 located on the IOX waveguides 109 on IOX chip 113.

Figure 3:
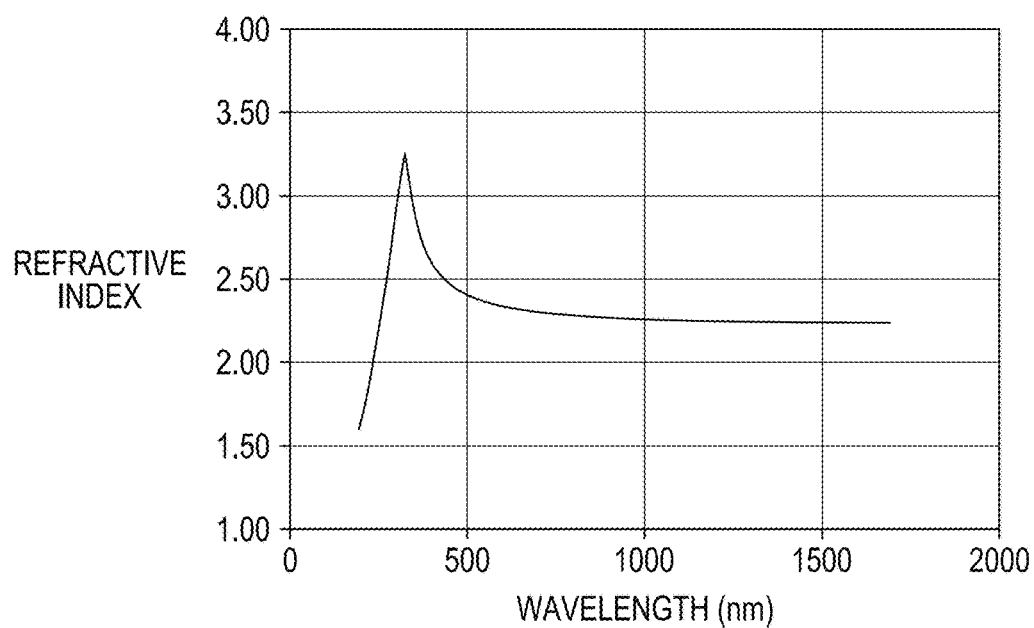
FIG. 3 shows the refractive index measured from a 165 nm-thick $TiO_2$ film deposited on a substrate using sputtering at room temperature.

FIGS. 2(a)-2(c) show one of three different arrangements that can be used for the interconnection of the polymer WGs with the IOX WGs utilizing the high index couplers described herein. In this particular arrangement, the couplers are fabricated on the IOX WGs. Subsequently, polymer WGs can be realized in situ using a dry film polymer to obtain the interconnection. In one example, the couplers are $TiO_2$ couplers fabricated on the IOX WGs substrate. FIG. 3 shows the refractive index measured from a 165 nm-thick TiO$_2$ film deposited on a substrate using sputtering at room temperature. The refractive index of TiO$_2$ is about 2.2325 at 1550 nm. Simulations were performed for a TiO$_2$ coupler to investigate the coupling efficiency between a polymer WG and an IOX WG. The 4 mm-long coupler comprises two tapers back-to-back, each tapering down linearly in width from 1 μm to 100 nm within a 2 mm-length. The simulation results suggest that the coupler can provide interconnection between the polymer WG and the IOX WG with coupling efficiencies of 73% and 74%, for TE and TM modes, respectively. The IOX WGs are fabricated on a glass substrate with a uniform width of about 24 μm, a depth about 6 μm, and the center of the core 3 μm beneath the glass top surface. The IOX WGs have a core index of 1.4935 and a cladding index of 1.4769. A polymer with a refractive index of 1.575 is used to fabricate the polymer WGs for the interconnect, and materials with a refractive index about 1.48 are used for the polymer waveguide cladding and as potting materials.

Figure 4A:
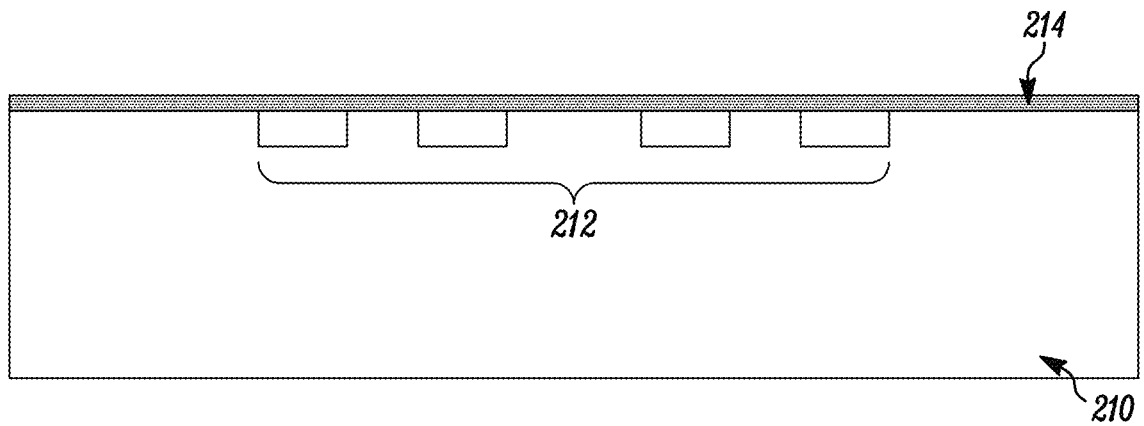
FIG. 4 illustrates a sequence of process steps that were employed to fabricate $TiO_2$ couplers on a IOX substrate.
Figure 4B:
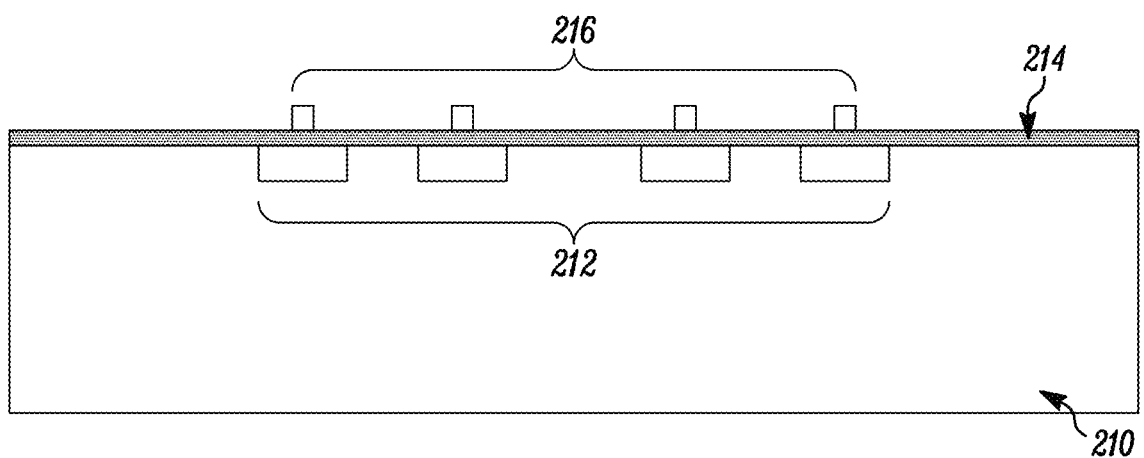
Figure 4C:
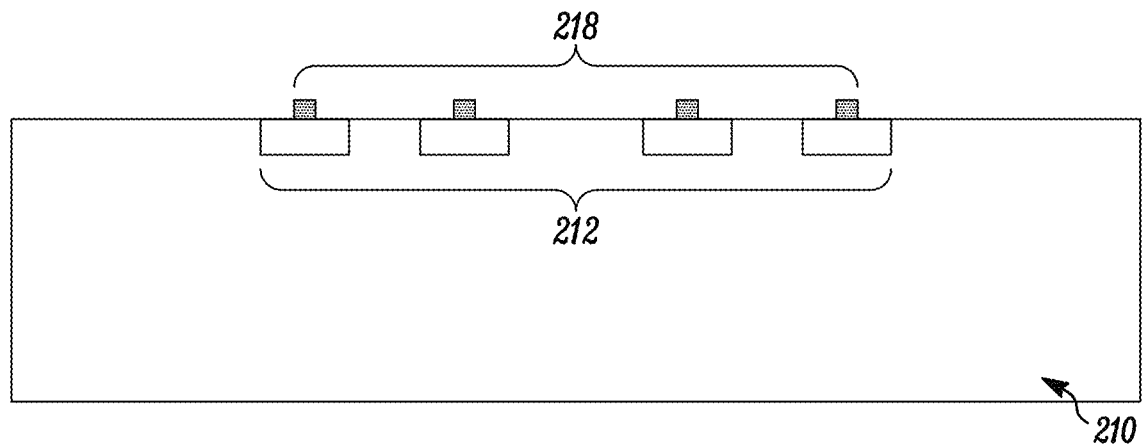

FIG. 4 illustrates a sequence of process steps that were employed to fabricate the TiO$_2$ couplers on the IOX substrate 210. First, in FIG. 4(a), TiO$_2$ was sputtered on the IOX substrate 210 on which the IOX waveguides 212 are formed. The sputtering was performed at room temperature to obtain a 165 nm-thick TiO$_2$ film 214. Negative photoresist (i.e., ma-N-2403) was coated on the TiO$_2$ film 214 to form a 350 nm-thick layer. The photoresist was patterned using electron-beam lithography (EBL) with alignment between the resulting patterns and the IOX WGs 212. Alternatively, deep ultraviolet (DUV) or imprint lithography can be used for the patterning process. The photoresist was then developed to realize the photoresist patterns 216, as shown in FIG. 4(b). The TiO$_2$ film 214 was patterned using deep reactive ion etching (DRIE) with the photoresist layer serving as the etch mask. The selectivity between the resist and the TiO$_2$ was measured to be 1:3 using a combination of gases (CH3, CH4 and Ar). Etching was stopped by timing based on the pre-measured film thickness and the etch rate of TiO$_2$. The TiO$_2$ couplers 218 were obtained after removal of the resist in Acetone, as shown in FIG. 4(c).

Figure 13A:
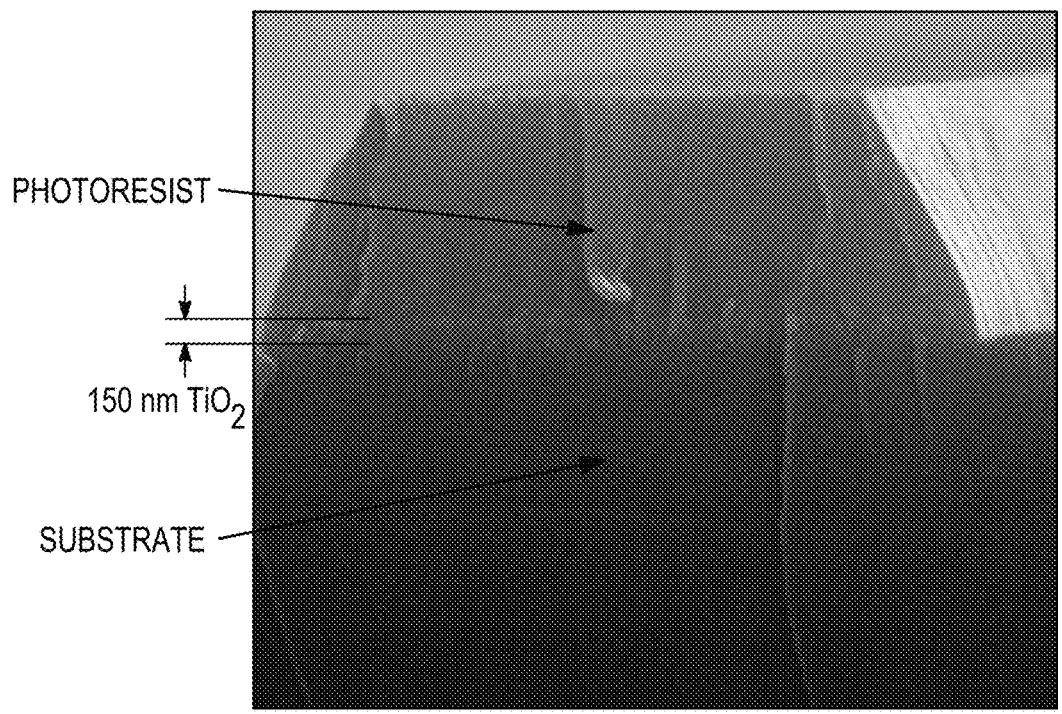
FIG. 13(a) is a SEM image showing a cross-sectional-view of a patterned 150 nm-thick $TiO_2$ film.
Figure 13B:
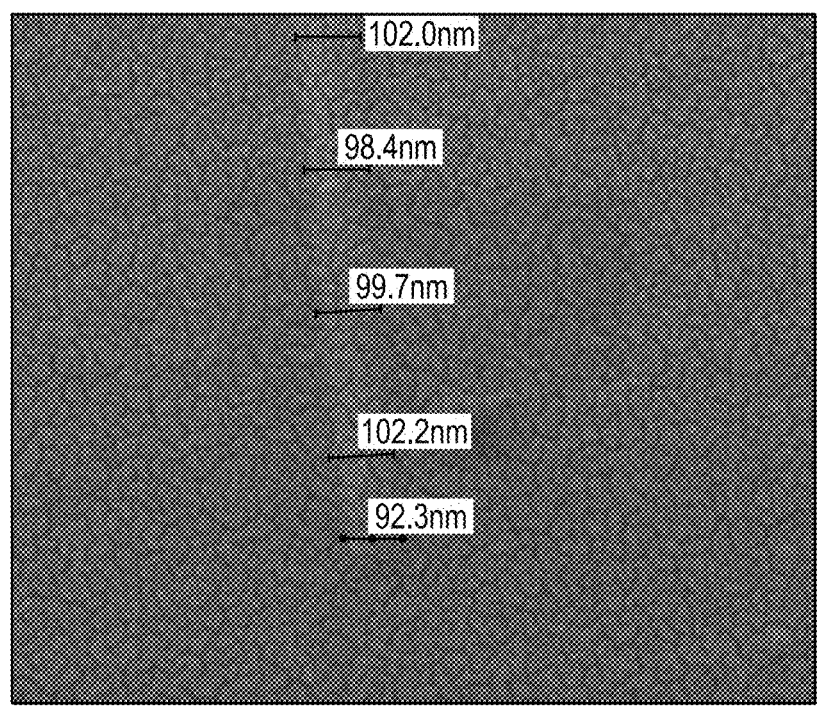
FIG. 13(b) shows a SEM image of a top view of a $TiO_2$ taper with a width of 100 nm at its tip.

The fabrication of TiO$_2$ tapered couplers can also be achieved using a dry etch in Ar/SF6 gases. To obtain TiO$_2$ waveguides and tapers, TiO$_2$ was sputtered on a Si substrate with a 5 μm-thick SiO$_2$ at room temperature to obtain a 150 nm-thick TiO$_2$ film. Negative photoresist (ma-N-2405) was spin-coated on the TiO$_2$ film to obtain a 700 nm-thick layer of photoresist. Patterns of uniform waveguides of various widths and waveguides with end-tapers were realized in the photoresist using EBL. Following development in the ma-D 532 developer, the TiO$_2$ was selectively etched in Ar/SF6 plasma where the patterned photoresist served as the etch mask. FIG. 13(a) is a SEM image showing the cross-sectional-view of a patterned TiO$_2$ waveguide 3 μm in width and 150 nm in thickness. A TiO$_2$ taper with a tip of about 100 nm in width was realized, as shown in the SEM image in FIG. 13(b). The grain features observed on the surface of the sample are that of a 10 nm-thick Au layer, which is sputter-coated for imaging purposes.

When coupling the IOX WGs and the polymer WGs in alignment with one another as shown in FIGS. 2(a)-2(c), a photosensitive polymer dry film, for example dry film polymer manufactured by Tokyo Ohka Kogyo America Inc (TOKA), is laminated on the IOX substrate so that it covers only one taper end of the TiO$_2$ tapered coupler while leaving the other taper end exposed to air. During soft-bakes at e.g., 65° C. and 95° C., the polymer dry film conforms to the tapered couplers on the substrate, establishing good contact between the polymer and the couplers. Polymer WGs, without tapers, were then obtained by selective UV direct writing utilizing maskless lithography with alignment between the polymer WGs and the IOX WGs. After a post-exposure bake at e.g., 95° C., the polymer film is further baked at a temperature between 120-150° C. to establish a contrast in the refractive index between the exposed area and the un-exposed area. Finally, a potting material with a matching index to that of the glass substrate is applied to the polymer WGs at the gap between the two chips (see FIG. 2(a)) to form the top cladding and to reduce losses due to transitions at corners. A potting material can also be applied at the two ends of the dry film, as shown in FIGS. 1(c) and (d).

Figure 14:
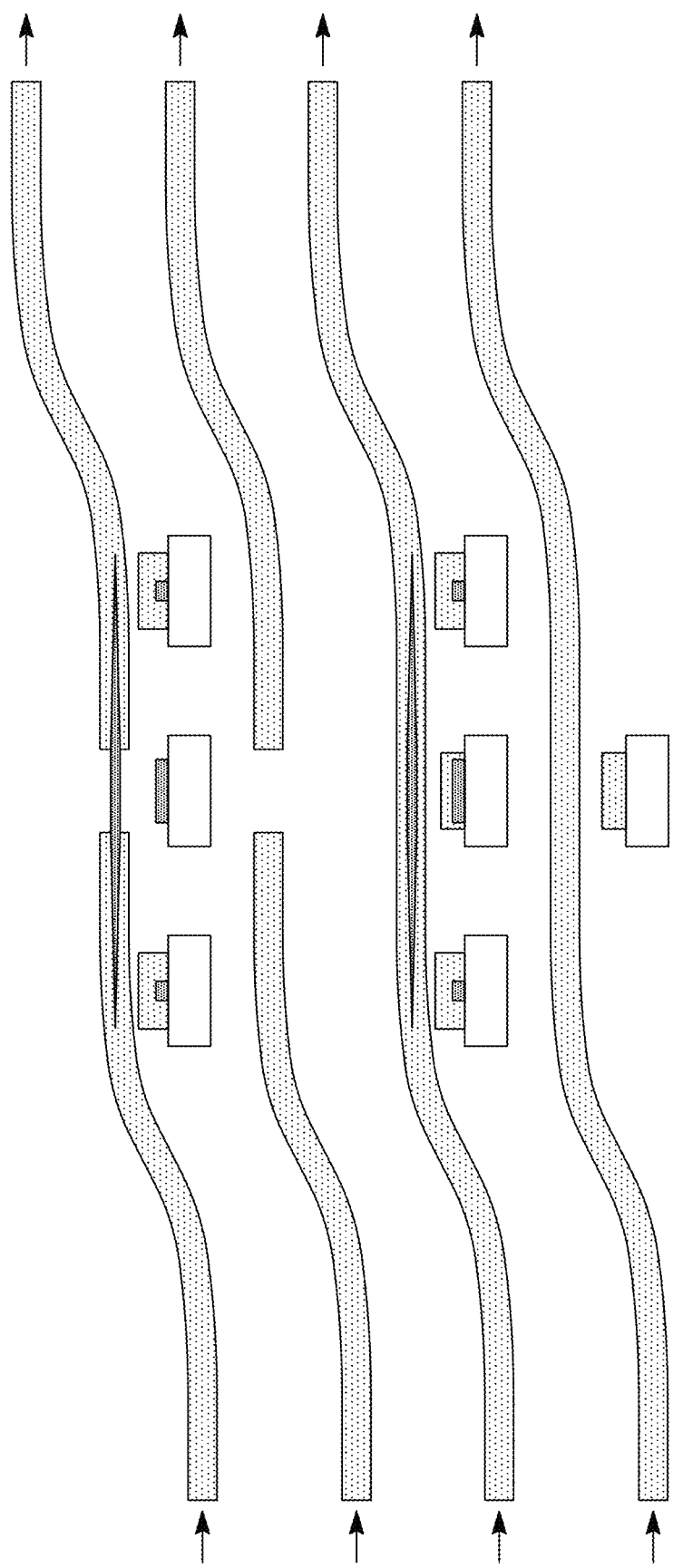
FIG. 14 is a schematic diagram showing a $TiO_2$ tapered coupler and a pair of polymer (SU-8) arranged in four different configurations.

In another example, a device was designed and fabricated to demonstrate a functional taper-coupler. The TiO$_2$ coupler has a 2 mm-long taper at each end of a TiO$_2$ waveguide, which is 1 mm in length with a uniform width of 1 μm, as shown in FIG. 14. The width of the taper changes linearly from 1 μm at one end of the waveguide to 100 nm at the taper tip spanning 2 mm in length. A pair of polymer (SU-8) input/output waveguides, 2 μm in thickness with a uniform width of 3 μm, were designed to be on top of the pair of tapers of the TiO$_2$ coupler. The polymer waveguides were in physical contact with only the two tapers, leaving the 1 mm-long TiO$_2$ waveguide between the two tapers exposed to air, as shown in the cross-sectional views for configuration (a) in FIG. 14. Three other configurations are designed as shown in FIG. 14: in configuration (b) a pair of polymer (SU-8) waveguides are aligned along the light propagation direction but with a 1 mm air gap between them; in configuration (c) a continuous polymer (SU-8) waveguide is located on top of a TiO$_2$ coupler, and in configuration (d) a continuous polymer (SU-8) waveguide is provided by itself without any coupler.

Figure 15A:
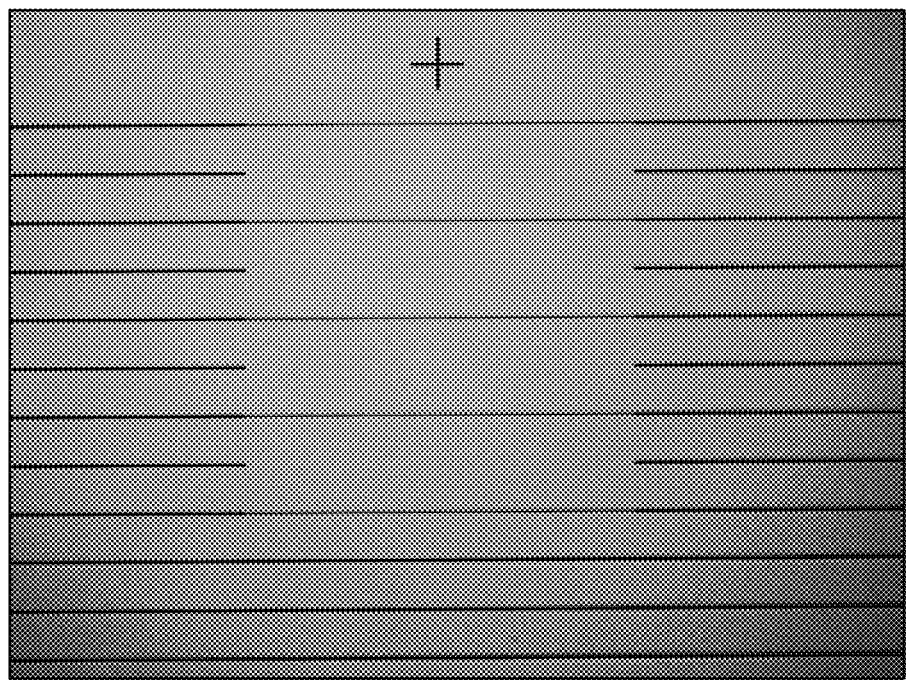
FIG. 15(a) is a microscopic image of a fabricated device with $TiO_2$ tapers and SU-8 WGs on a single chip.
Figure 15B:
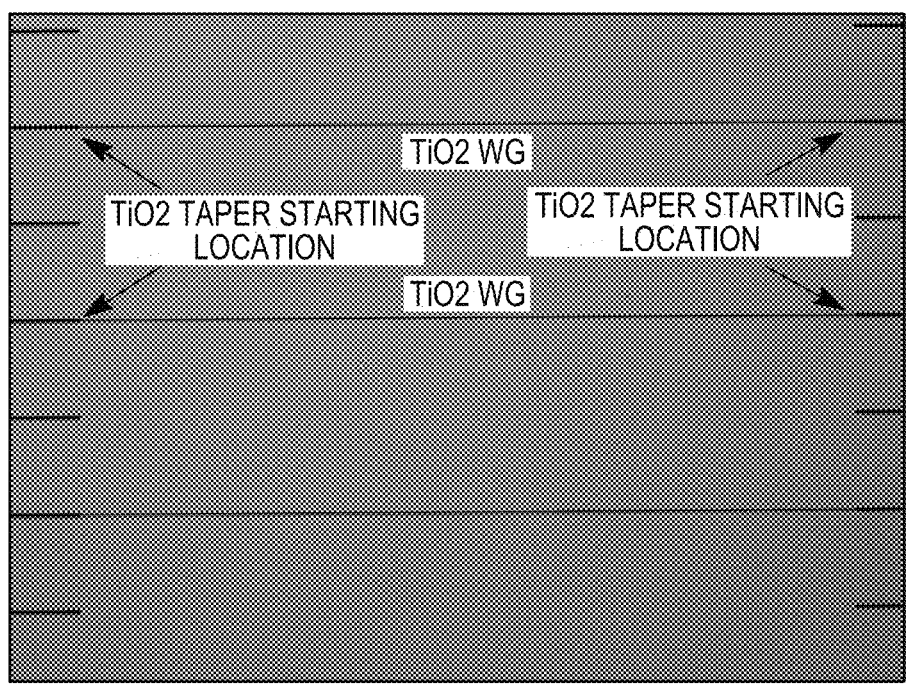
FIG. 15(b) is a close-up view showing the physical coupling of the $TiO_2$ tapers and the SU-8 WGs in FIG. 15(a)
Figure 15C:
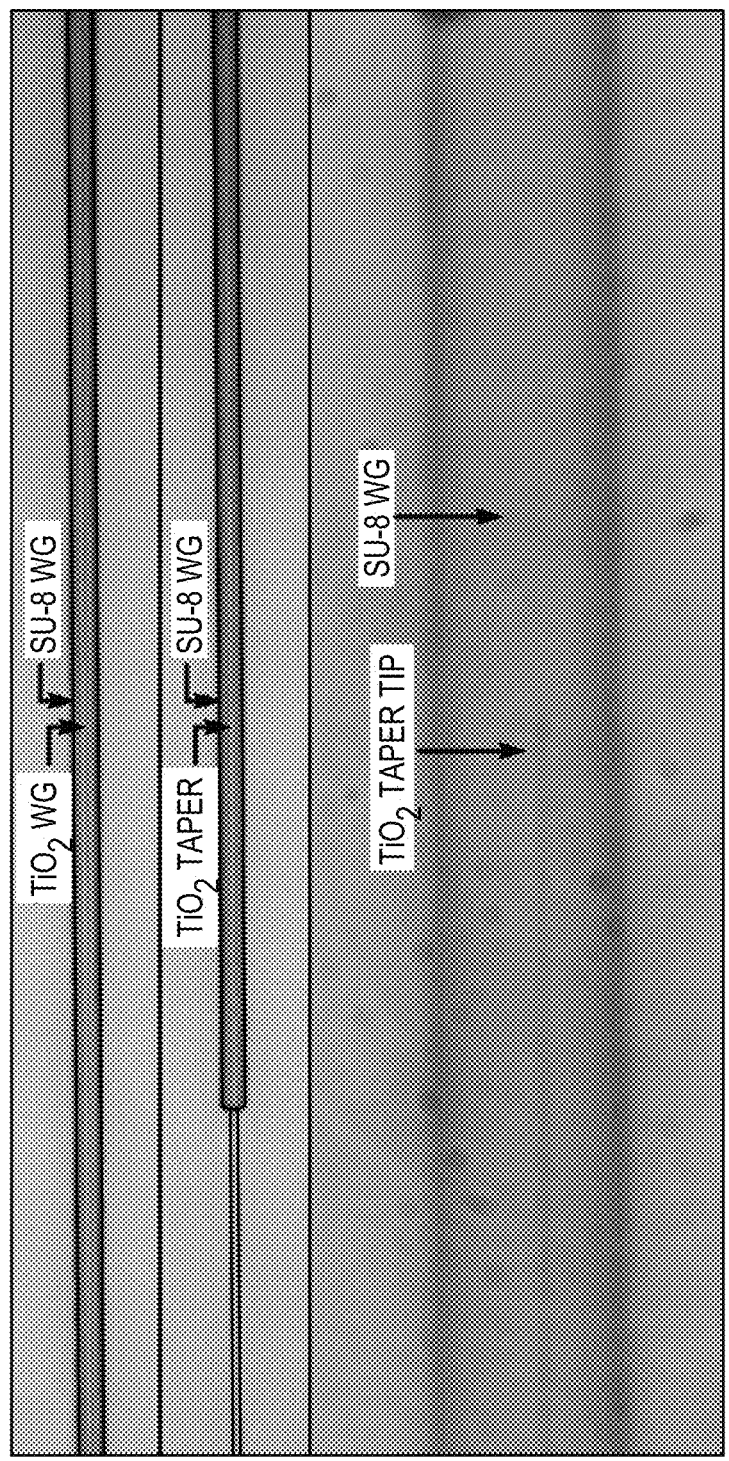
FIG. 15(c) are microscopy images showing SU-8 WGs on top of a $TiO_2$ WG and $TiO_2$ taper with good alignment.

The TiO$_2$ tapered couplers, in configurations (a) and (d), together with alignment marks, were fabricated on a Si substrate with a 5 μm-thick SiO$_2$ utilizing EBL lithography and dry etch in Ar/SF6 as described in connection with FIG. 4. The SU-8 waveguides were obtained utilizing maskless lithography using a Heidelberg MLA 150 aligner. A microscopic image of the fabricated device, shown in FIG. 15(a), illustrates the integration of TiO$_2$ couplers and SU-8 waveguides on a single chip. The TiO$_2$ coupler is in physical contact with the pair of SU-8 waveguides at the tapers only, as indicated in the close-up view of FIG. 15(b). The alignment of the SU-8 waveguides with the TiO$_2$ couplers are excellent as demonstrated in the high magnification images in FIG. 15(c).

An experiment was performed to test the functionality of the TiO$_2$ tapered couplers shown in FIG. 14, where light at 1310 nm was launched into an input SU-8 waveguide and the guided mode was observed at the corresponding output of the SU-8 waveguide. At 1310 nm, the refractive indices of TiO$_2$, SU-8 and SiO$_2$ are 2.243, 1.556, and 1.446, respectively. For all four configurations shown in FIG. 14, the light propagation distance is the same. As expected, a guided mode was observed for a continuous SU-8 waveguide, in configurations (c) and (d). No mode was observed for configuration (b) because of the 1 mm gap between the pair of SU-8 waveguides. A guided mode was observed for configuration (a) where the TiO$_2$ coupler is located between a pair of SU-8 waveguides. No apparent difference was detected in mode intensity between configurations (a), (c) and (d). This demonstrates that the TiO$_2$ coupler, with a high refractive index and back-to-back taper structures, optically couples light into and out of waveguides of much lower refractive index with reasonable efficiencies, as suggested by the simulations.

Figure 5A:
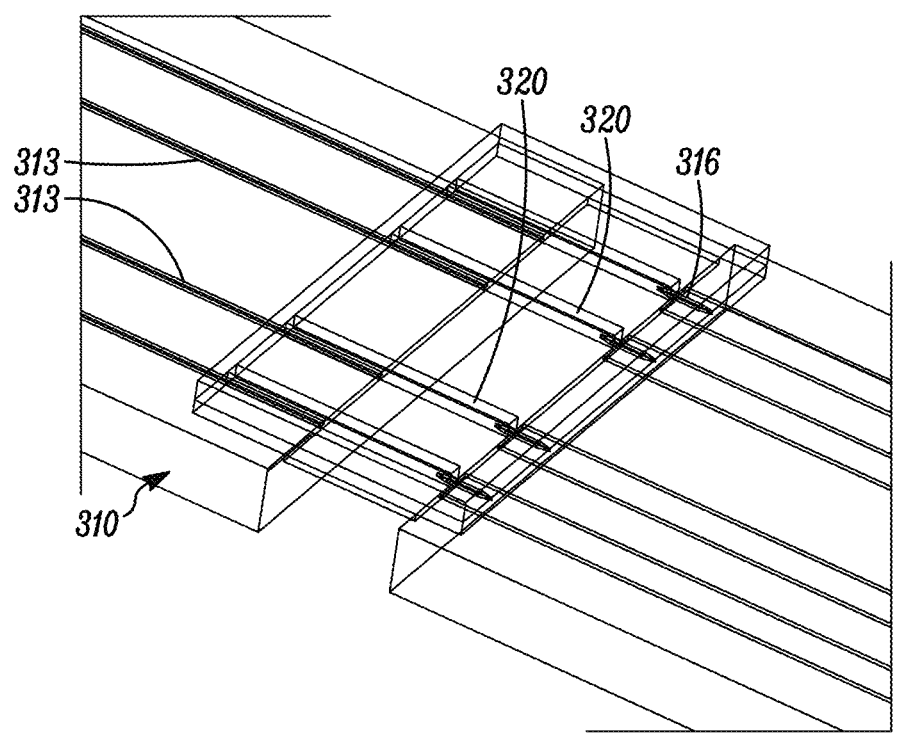
FIG. 5(a) shows a perspective view of the tapered couplers and the polymer WGs when located on the same plane.
Figure 6A:
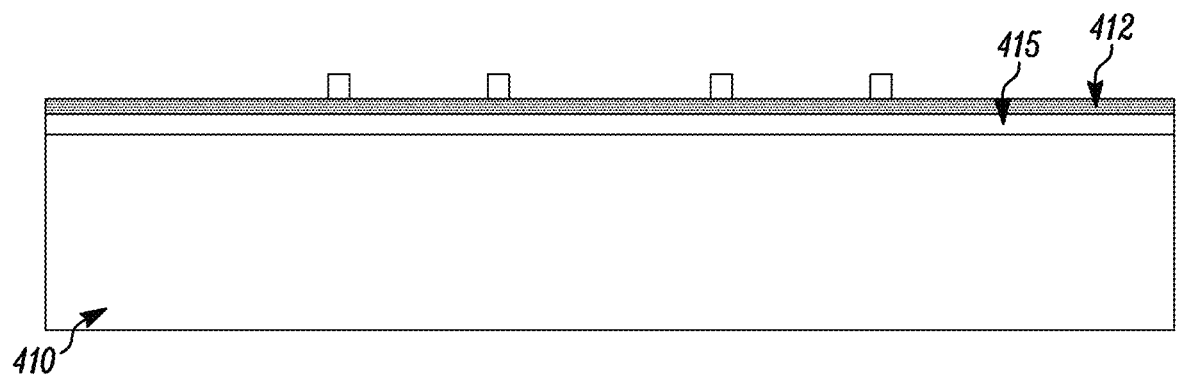
FIGS. 6(a)-6(f) show one example of a sequence of process steps that may be used to fabricate the polymer WGs and the tapered couplers.
Figure 6B:
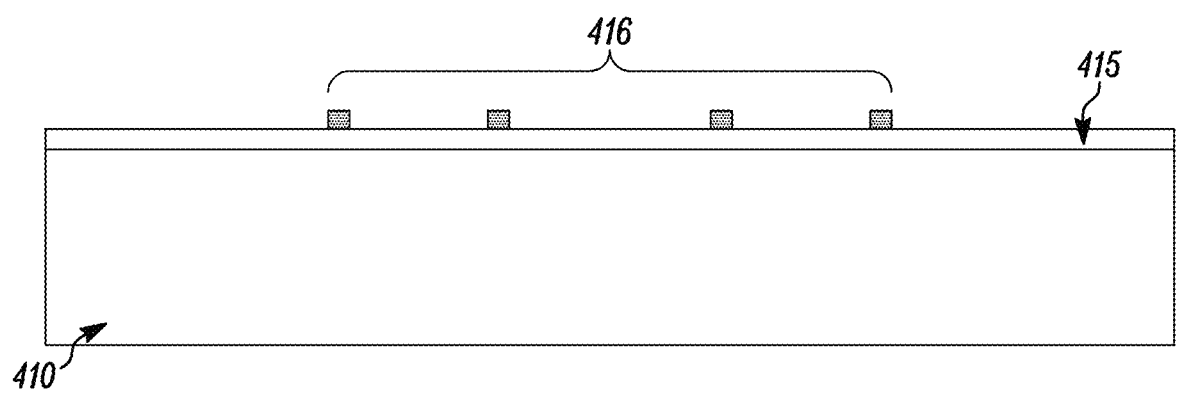
Figure 6C:
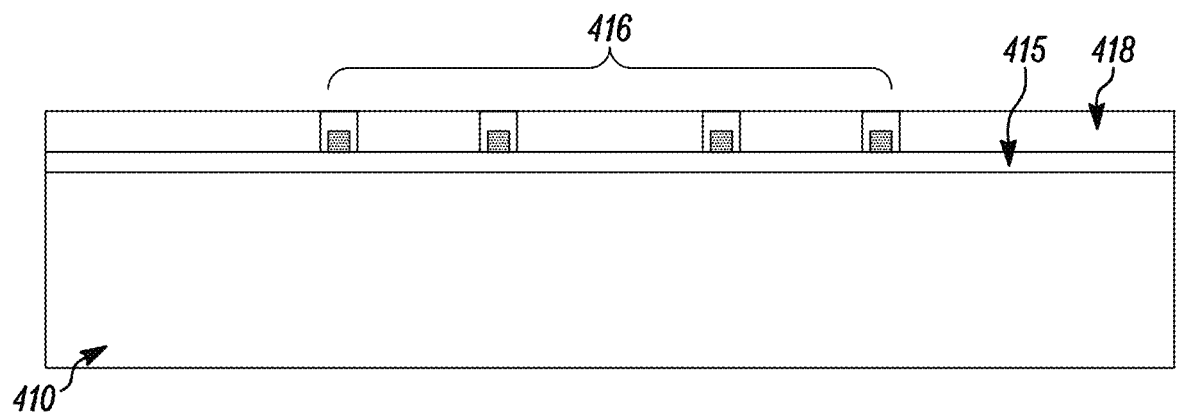
Figure 6D:
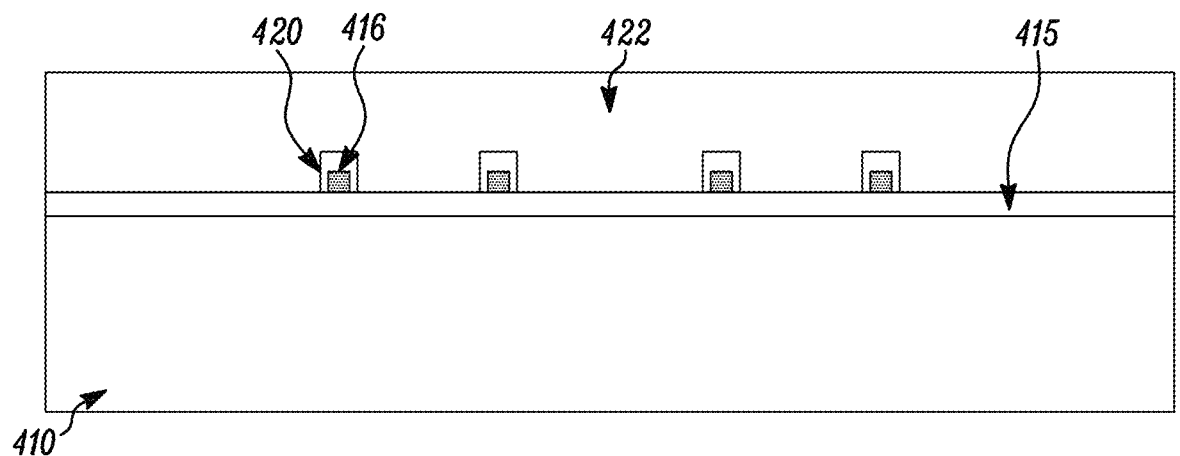
Figure 6E:
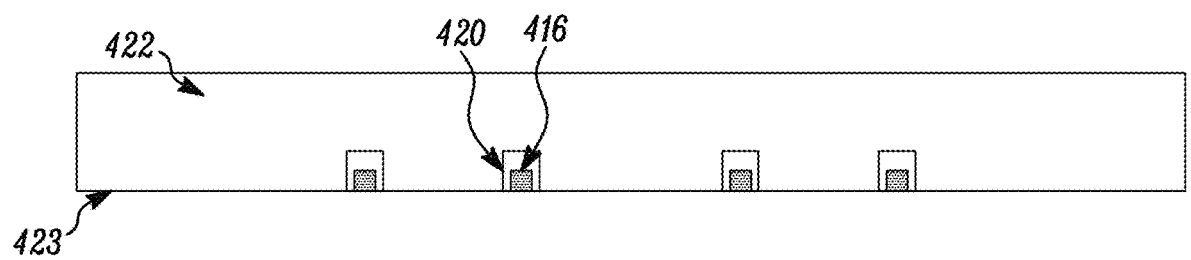
Figure 6F:
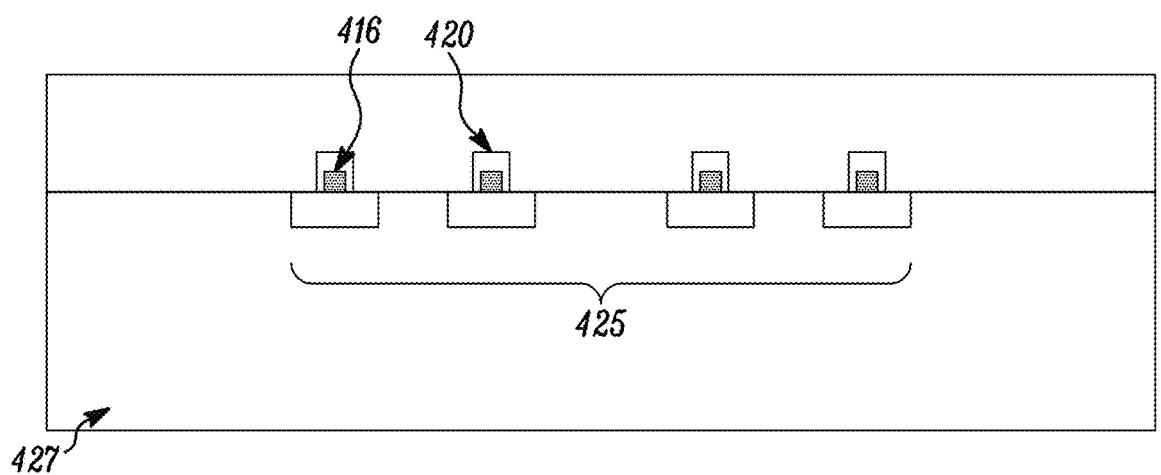

In an alternative embodiment, the fabrication of high index tapered couplers can be incorporated with the polymer WG fabrication process. That is, as shown in FIGS. 5(a)-5(c), the tapered couplers 316 are fabricated with the polymer WGs 320 located on the Si WGs 313, which are formed on the Si substrate 310. FIGS. 6(a)-6(f) illustrate a sequence of process steps that may be employed to fabricate this arrangement. First, a high index film 412 of e.g., TiO$_2$, is formed on a suitable release layer 415 located on a Si substrate 410 and patterned in FIG. 6(a) using a negative photoresist to define the tapered couplers 416 in FIG. 6(b). A polymer layer 418 is then deposited on the release layer 415 in FIG. 6(c). The polymer layer 418 is then patterned to define the WG cores 420 shown in FIG. 6(d). In addition, a top cladding layer 422 is deposited over the polymer WGs 420. The resulting structure, including the polymer WGs 420 and the top cladding layer 422 together with the couplers 416, is then released from the Si substrate 410 as shown in FIG. 6(e). The exposed bonding surface 423 of the structure is modified to establish attachment with the IOX WGs 425 on the IOX chip 427. The interconnect is realized upon attachment of the polymer WGs 420 to the IOX WGs 425 on the IOX chip 427 with alignments, as shown in FIG. 6(f). In this way the interconnect shown in FIGS. 5(a)-5(c) can be formed. Techniques for modifying the bonding surface 423 and suitable coupling agents for attaching the structure to the IOX chip 427 may be found in U.S. Appl. Ser. No. 62/793,964 [Docket No. UA19-092], which is hereby incorporated by reference in its entirety.

Figure 7A:
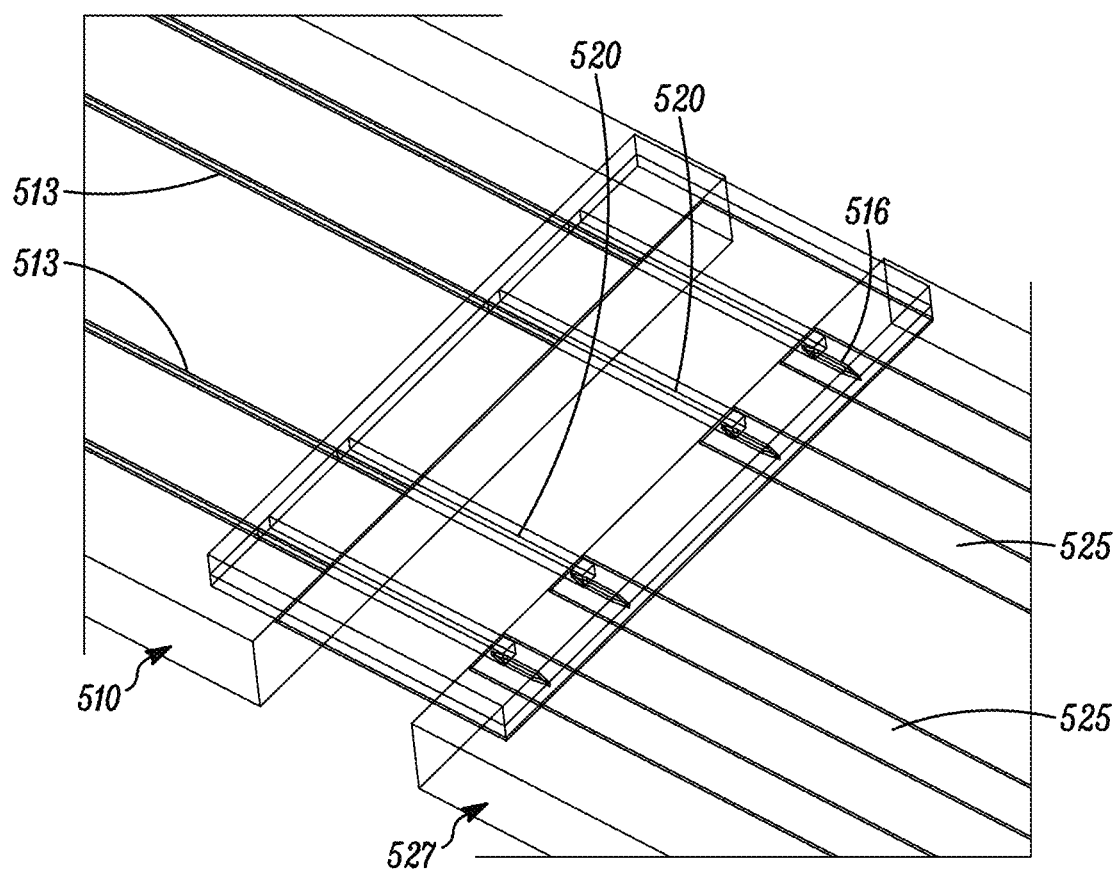
FIG. 7(a) shows a perspective view of the tapered couplers and the polymer WGs when located on different planes.
Figures 7B, 7C:
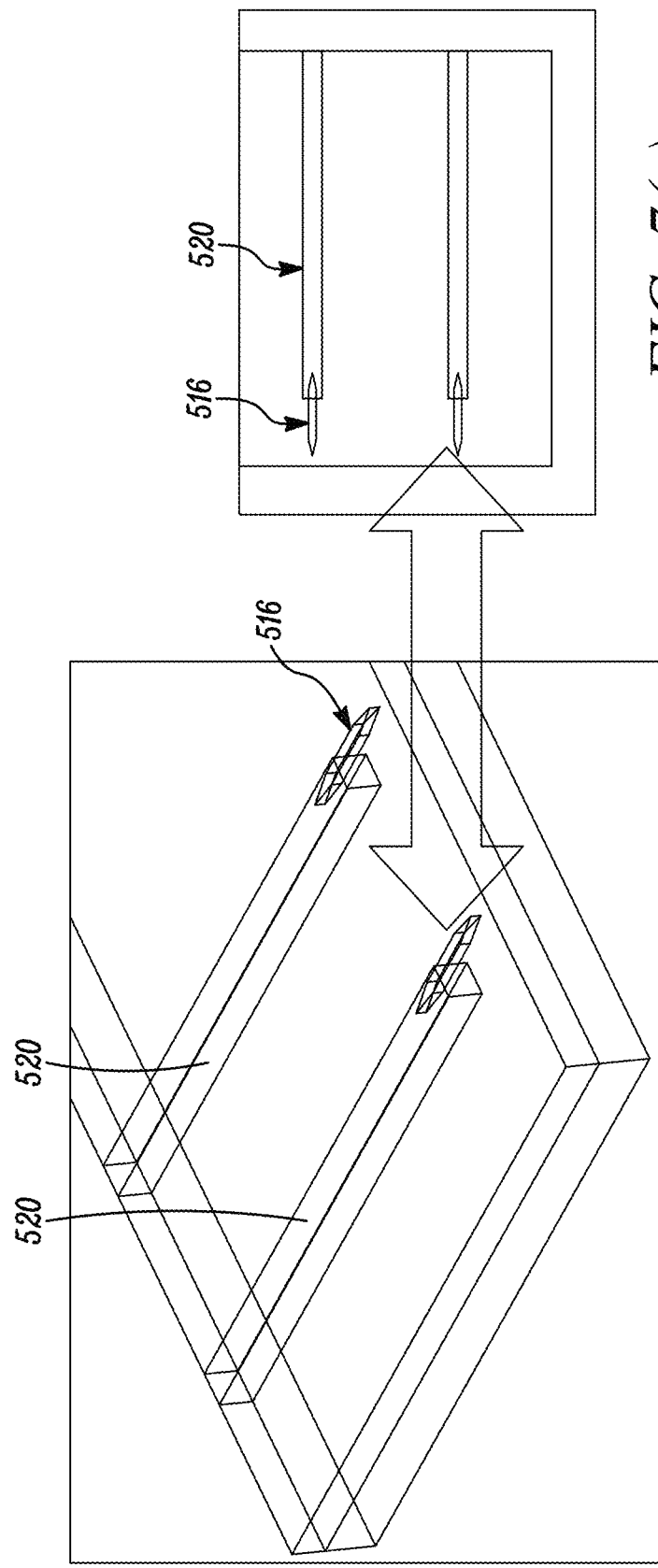
FIG. 7(b) shows a more detailed view of the tapered couplers and the polymer WGs shown in FIG. 7(a)
FIG. 7(c) shows a top view of the tapered couplers and the polymer WGs shown in FIGS. 7(a) in 7(b)
Figure 7D:
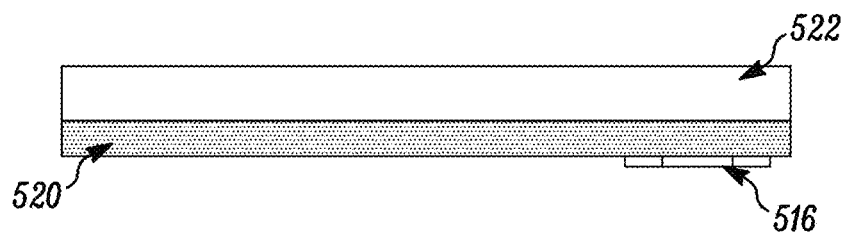
Figure 7E:
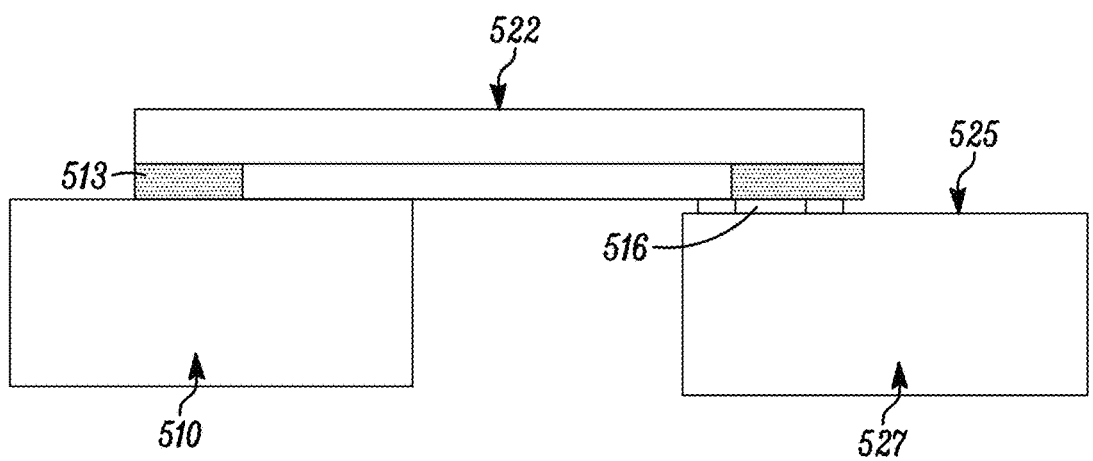
Figure 7F:
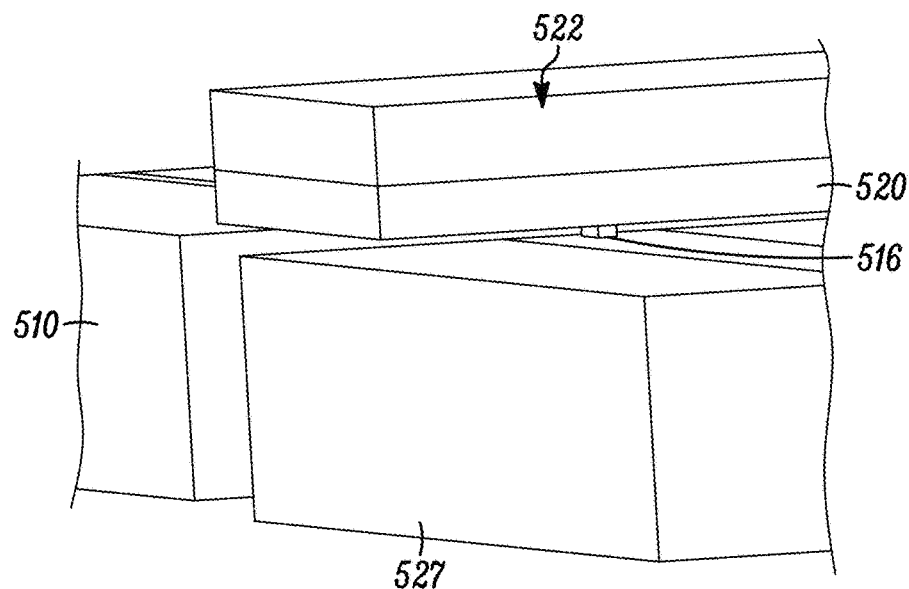

In the embodiment shown in FIGS. 5 and 6 in which the tapered couplers are fabricated with the polymer WGs, the tapered couplers and the polymer WGs are formed on the same plane. On the other hand, FIGS. 7(a)-7(f) show another embodiment in which the tapered couplers and the polymer WGs are formed on different planes. As shown in FIGS. 7(a)-7(c), the tapered couplers 516 are formed on pre-fabricated polymer WGs 520 that couple Si WGs 513 on Si substrate 510 to IOX WGs 525 on IOX chip 527. FIGS. 7(d)-7(f) show additional views of the structure illustrating the different planes in which the tapered couplers 516 and the polymer WGs 520 are located and the gap between the polymer WGs 520 and the IOX WGs 525. The gap may be filled with a potting material having a suitable refractive index so that it can serve as a cladding for the tapered couplers 516. Also shown in FIGS. 7(d)-7(f) is the substrate 522 on which the pre-fabricated polymer WGs 520 are formed.

Figure 8A:
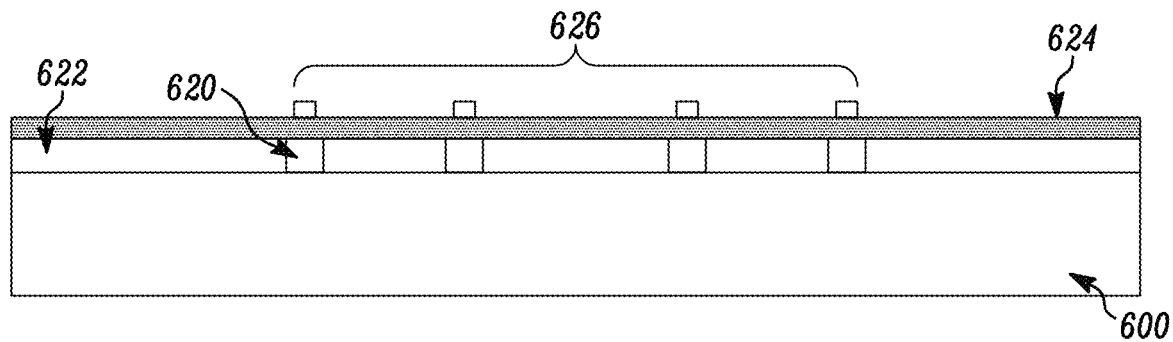
FIGS. 8(a)-8(c) illustrate a sequence of process steps that may be employed to fabricate the structure shown in FIGS. 7(a)-7(f).
Figure 8B:
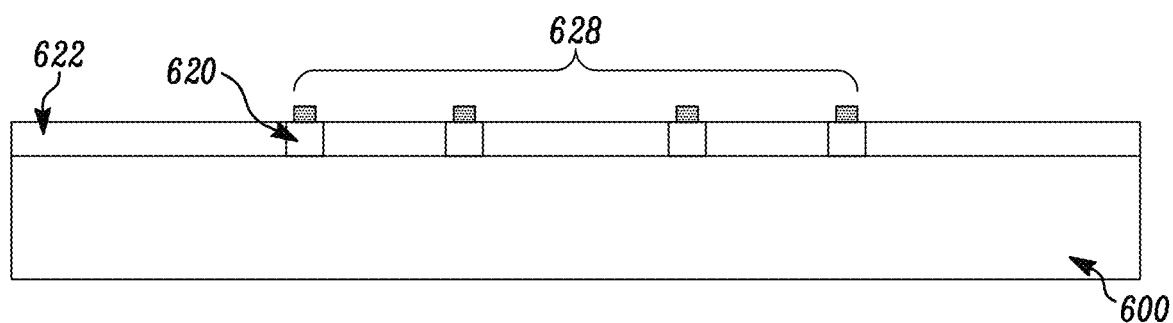
Figure 8C:
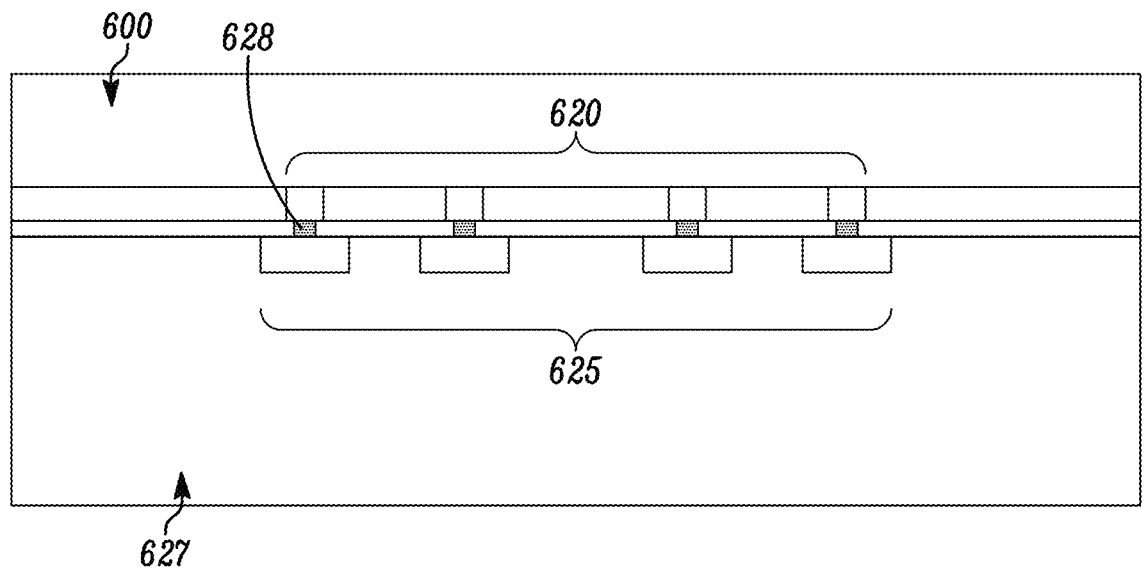

FIG. 8 illustrates a sequence of process steps that may be employed to fabricate the structure shown in FIGS. 7(a)-7(f). First, in FIG. 8(a) a high index film 624 is formed by depositing (e.g., sputtering) a high index material such as TiO$_2$ on a surface of a substrate 600 that includes prefabricated polymer WG cores 620 and adjacent cladding 622. A patterned photoresist 626 is formed on the high index film 624 with alignment between the patterned photoresist 626 and the polymer WG cores 620. The high index film 624 is patterned in FIG. 8(b) using deep reactive ion etching (DRIE) with the patterned photoresist 626 serving as the etch mask to thereby form the tapered couplers 628 after removal of the resist. The resulting structure may be attached to the IOX WGs 625 formed on the IOX chip 627 with alignment between the tapered couplers 628 and the IOX WGs 625. The attachment process may be performed using coupling agents and surface modification techniques as described above in connection with FIGS. 6(a)-6(f).

Figure 9:
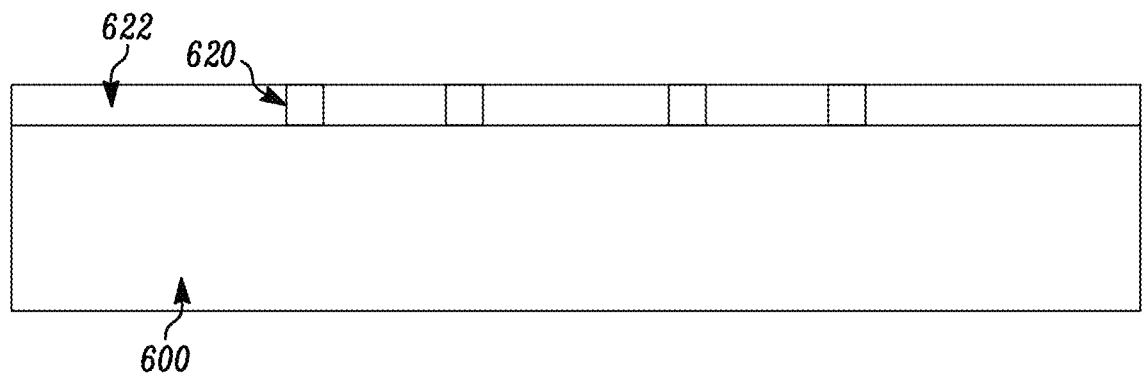
FIG. 9 shows one method that may be employed to form the pre-fabricated WGs shown in FIGS. 7 and 8.

FIG. 9 shows one method that may be employed to form the pre-fabricated WGs shown in FIGS. 7 and 8. In this method the polymer WG cores 620 and the cladding 622 can be obtained utilizing photo-defined techniques based on polymer index changes that arise from ultraviolet (UV) and/or thermal treatments that are applied to the polymer.

Figure 10A:
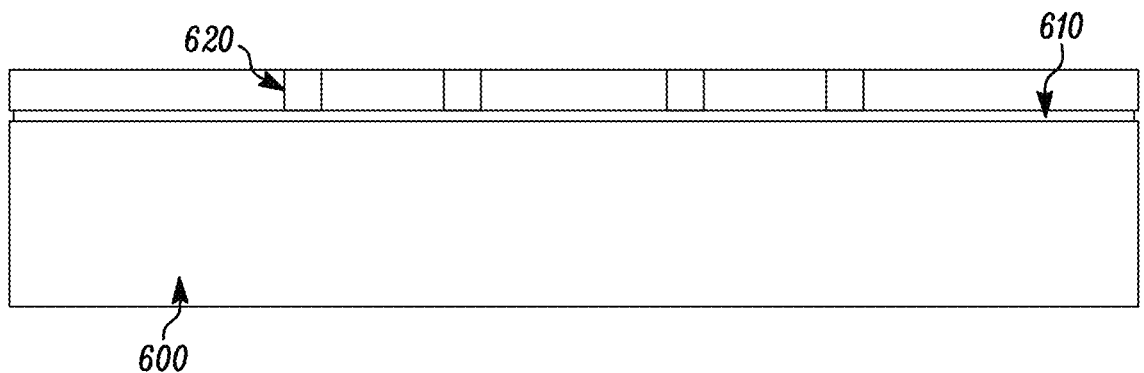
FIGS. 10(a)-10(c) show another method that may be employed to form the pre-fabricated WGs shown in FIGS. 7 and 8.
Figure 10B:
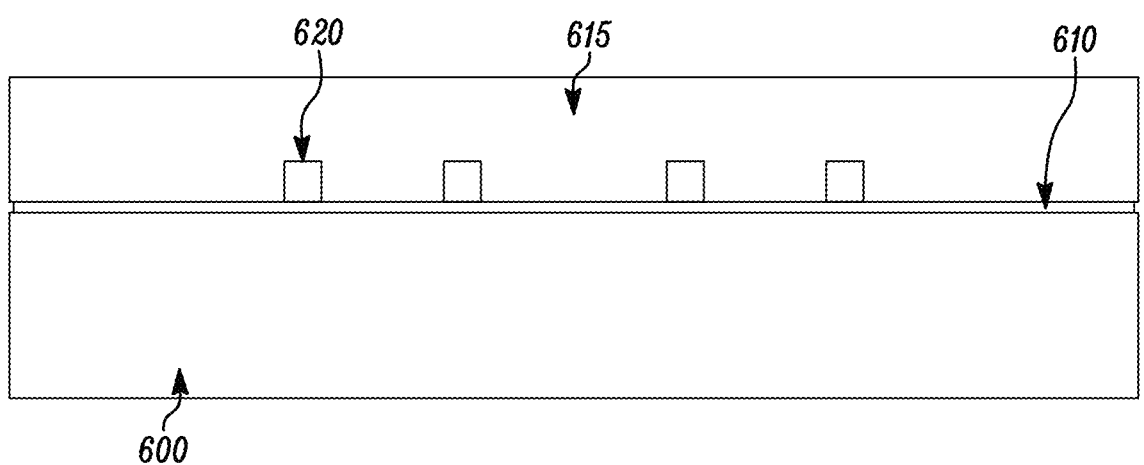
Figure 10C:
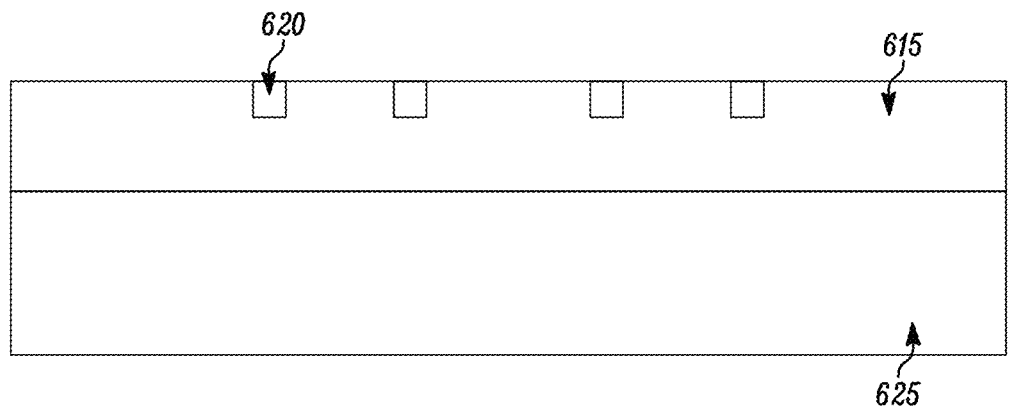

FIGS. 10-(a)-10(c) show another method that may be employed to form the pre-fabricated WGs shown in FIGS. 7(a)-(f) and 8. In this method the polymer WGs can be first fabricated on a Si substrate, but then released and attached to a carrier substrate. In particular, in FIG. 10(a) the polymer WG cores 620 are patterned in a polymer layer formed formed on a release layer 610 that is in turn located on an Si substrate 600. A polymer WG cladding 615 is then deposited on the polymer WG cores 620 in FIG. 10(b). The Si substrate 600 then can be removed and the resulting structure attached to a carrier substrate 625, with the polymer WG cores 620 being located on an exposed upper surface. The carrier substrate 625 may be rigid or flexible depending on the applications. Flexible carrier substrates may be advantageous in some cases because they can accommodate offsets between the two photonic chips that are to be optically coupled to one another.

Figure 11A:
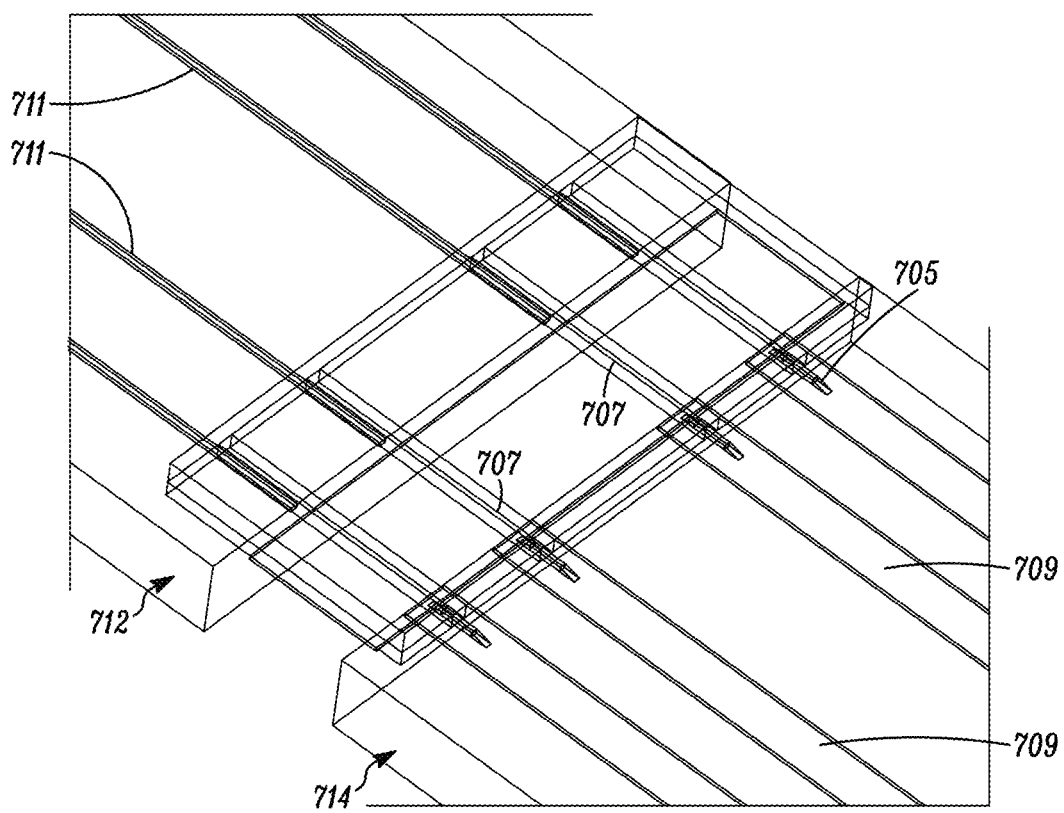
FIG. 11(a) shows a perspective view of vertically tapered couplers that each couple one end of a polymer WG to an IOX WG, with the other end of each polymer WG being coupled to a Si WG.
Figure 11B:
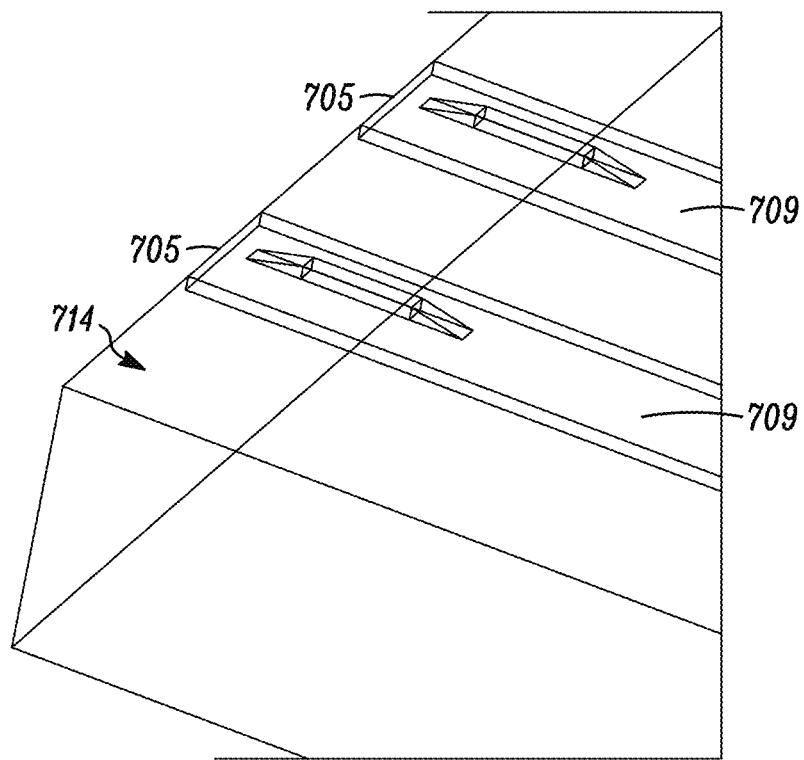
FIG. 11(b) shows a more detailed view of the vertically tapered couplers on the IOX WGs.

In yet another embodiment shown in FIGS. 11(a) and 11(b), the high index tapered couplers are tapered in the vertical direction instead of in the lateral direction. In this example the uniform-cross-section polymer WGs 707 connect tapered Si/SiN WGs 711 on the Si chip 712 with vertically tapered couplers 705 located on the IOX WGs 709 on IOX chip 714.

Figure 12A:
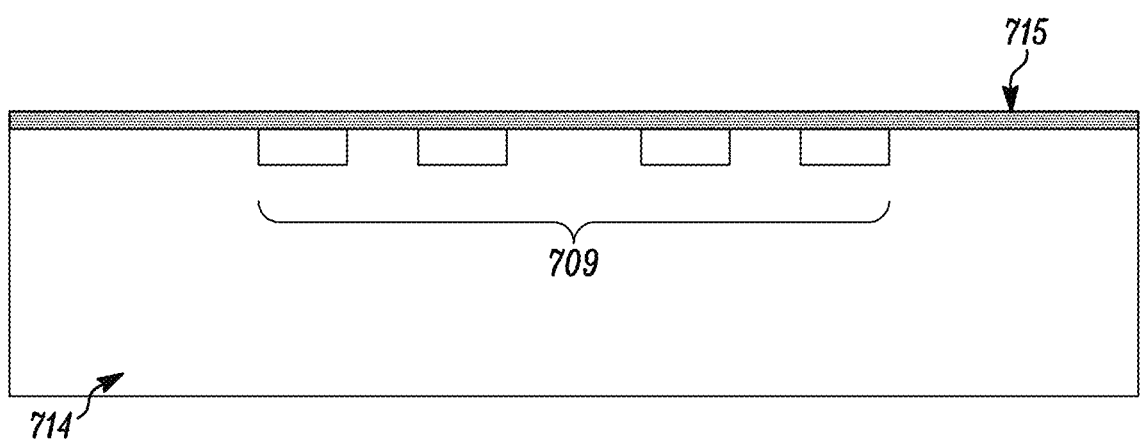
FIG. 12 shows a sequence of process steps that may be used to fabricate the vertically tapered couplers shown in FIG. 11.
Figure 12B:
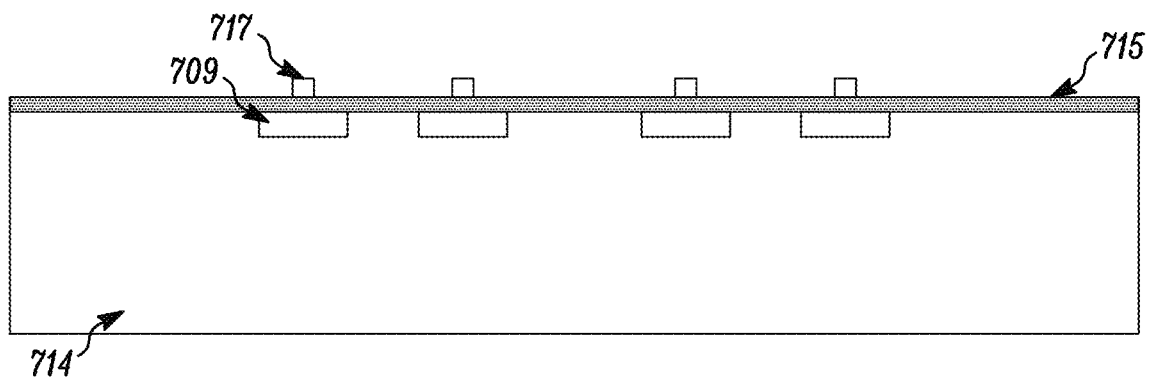
Figure 12C:
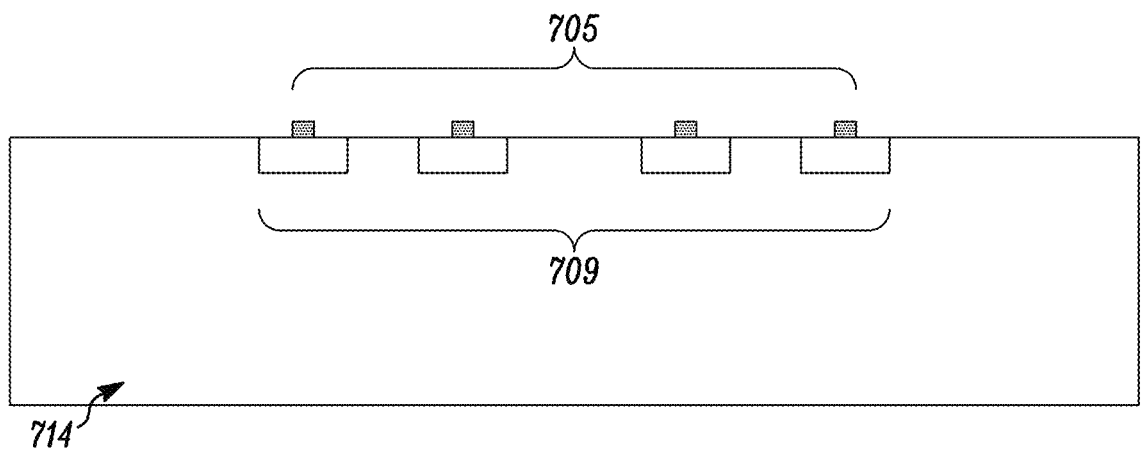

The vertically tapered couplers 705 shown in FIGS. 11(a) and 11(b) can be fabricated, for example, by gray scale optical lithography, as illustrated by the sequence of process steps in FIGS. 12(a)-12(c). First, in FIG. 12(a), a high index film 715 of e.g., TiO$_2$, is formed on a IOX substrate 714 over the IOX WGs 709. Then, in FIG. 12(b), a patterned photoresist 717 having a gradient in thickness is formed over the high index film 715 in alignment with the IOX WGs 709 so that a corresponding height gradient can be transferred to the high index film 715 upon etching. In this way the vertically tapered couplers 705 are then obtained as shown in FIG. 12(c) after completion of the etching process and removal of the patterned photoresist 717.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The invention claimed is:

1. A method for establishing optical coupling between a first planar waveguide and a second waveguide that are spatially separated from one another, comprising:
arranging an optical interconnect on the first planar waveguide, the optical interconnect being defined by a single waveguide having first and second end portions and an intermediate portion, each of the end portions having an inverse taper; and
arranging the second waveguide on the optical interconnect so that the second waveguide overlaps with the first end portion of the optical interconnect but not the second end portion of the optical interconnect such that the first end portion of the optical interconnect is located between the first planar waveguide and the second waveguide to thereby enable an adiabatic transition of an optical signal from the first planar waveguide to the second waveguide via the optical interconnect, the first planar waveguide and the second waveguide having different refractive indices from one another at an operating wavelength and the optical interconnect having a higher refractive index at the operating wavelength than the refractive indices of a core of the first planar waveguide and a core of the second waveguide, wherein at least a portion of the second waveguide is located on a different substrate than the first planar waveguide and the optical interconnect is entirely located on a substrate on which the first planar waveguide is located.

2. The method of claim 1, wherein at least one of the first and second inverse tapers is an in-plane taper.

3. The method of claim 2, wherein each of the inverse tapers taper down to a width between 0.1 µm and 0.8 µm.

4. The method of claim 3, wherein a thickness of the optical interconnect is between 0.1 µm and 0.3 µm.

5. The method of claim 4, wherein a width of the intermediate portion is between 0.5 µm and 5.0 µm.

6. The method of claim 1, wherein at least one of the first and second inverse tapers is a vertical taper.

7. The method of claim 6, wherein each of the inverse tapers taper down to a thickness between 0.5 µm and 2.0 µm.

8. The method of claim 1, wherein the first planar waveguide is an ion-exchanged glass waveguide.

9. The method of claim 8, wherein the first planar waveguide has a uniform width and thickness along its length.

10. The method of claim 1, wherein the first planar waveguide is located on a first photonic chip.

11. The method of claim 10, wherein arranging the second waveguide on the optical interconnect includes arranging a first end portion of the second waveguide on the optical interconnect and a second end portion of the second waveguide on a third waveguide located on a second photonic chip.

12. The method of claim 11, wherein the first and second photonic chips are located on a substrate with a gap and/or a step therebetween, the second waveguide spanning the gap and/or the step between the first and second chips.

13. The method of claim 1, wherein the second waveguide is a polymer waveguide.

14. The method of claim 1, wherein the second waveguide has a uniform width and thickness along its length.

15. The method of claim 1, wherein arranging the optical interconnect on the first planar waveguide includes forming the optical interconnect on the first planar waveguide.

16. The method of claim 15, wherein forming the optical interconnect on the first planar waveguide includes forming the optical interconnect using a photolithographic technique.

17. The method of claim 15, wherein forming the optical interconnect on the first planar waveguide includes depositing a material that forms the optical interconnect on a substrate on which the first planar waveguide is located; applying a photoresist over the deposited material and patterning the photoresist; etching the material using the patterned photoresist as an etch mask.

18. The method of claim 15, wherein forming the optical interconnect on the first planar waveguide includes depositing a waveguide material that forms the optical interconnect on a substrate on which the first planar waveguide is located; depositing a metal layer serving as a hard mask, applying a photoresist over the hard mask and patterning the photoresist; etching the hard mask; and etching the waveguide material using the hard mask as an etch mask.

19. The method of claim 1, wherein arranging the second waveguide on the optical interconnect includes arranging a pre-fabricated waveguide on the optical interconnect.

20. The method of claim 1, wherein arranging the second waveguide on the optical interconnect includes forming the second waveguide on the optical interconnect.

21. The method of claim 20, wherein forming the second waveguide on the optical interconnect includes applying a photosensitive dry polymer film on the optical interconnect and defining the second waveguide in the photosensitive dry polymer film by a direct writing process using maskless lithography.

22. The method of claim 20, wherein forming the second waveguide on the optical interconnect includes: forming the optical interconnect on a sacrificial substrate; forming the second waveguide over the optical interconnect to define a releasable waveguiding structure; removing the releasable waveguiding structure from the sacrificial substrate; and attaching the releasable waveguiding structure to the first planar waveguide such that the optical interconnect is disposed on the first planar waveguide.

23. The method of claim 1, wherein the inverse tapers taper down from a width of 1 µm to 100 nm over a distance between 0.02 mm and 10 mm.

24. The method of claim 1, further comprising applying potting material serving as a cladding over the second waveguide and at least an exposed portion of the optical interconnect adjacent to the second waveguide.

25. The method of claim 1, wherein the optical interconnect is formed from a material selected from the group consisting of including $Si_3N_4$, $TiO_2$, GeO, $Al_2O_3$, tantalum pentoxide and high index polymer.

26. The method of claim 1, wherein the intermediate portion has a length between 0.1 mm and 1 cm.

27. The method of claim 26, wherein the intermediate portion has a uniform width and height along its length.

28. The method of claim 1, wherein the intermediate portion, the first planar waveguide and the second waveguide are collinear.

29. The method of claim 1, wherein the intermediate portion is curvilinear.

30. The method of claim 29, wherein the intermediate portion is S-shaped.

31. An optical arrangement fabricated in accordance with the method of claim 1.

* * * * *